United States Patent [19]

Grodevant

[11] Patent Number: 5,260,554
[45] Date of Patent: Nov. 9, 1993

[54] SYSTEM FOR AUTOMATICALLY READING SYMBOLS, SUCH AS BAR CODES, ON OBJECTS WHICH ARE PLACED IN THE DETECTION ZONE OF A SYMBOL READING UNIT, SUCH AS A BAR CODE SCANNER

[75] Inventor: Scott R. Grodevant, Hilton, N.Y.

[73] Assignee: PSC, Inc., Webster, N.Y.

[21] Appl. No.: 786,147

[22] Filed: Oct. 31, 1991

Related U.S. Application Data

[63] Continuation-in-part of Ser. No. 710,839, Jun. 5, 1991.

[51] Int. Cl.[5] ............................................. G06K 7/10
[52] U.S. Cl. .................................. 235/462; 235/463; 235/470; 250/222.1; 250/568
[58] Field of Search ........................... 250/222.1, 568; 235/462, 463, 470

[56] References Cited

U.S. PATENT DOCUMENTS

| | | | |
|---|---|---|---|
| 3,436,540 | 4/1969 | Lamorlette | 250/222.1 |
| 3,925,639 | 12/1975 | Hester | 250/555 |
| 4,072,859 | 2/1978 | McWaters | 250/568 |
| 4,240,064 | 12/1980 | Dev Choudhury | 235/455 |
| 4,369,361 | 1/1983 | Swartz et al. | 235/462 |
| 4,639,606 | 1/1987 | Boles et al. | 235/462 |
| 4,766,297 | 8/1988 | McMillan | 235/462 |
| 4,893,005 | 1/1990 | Stiebel | 250/221 |

FOREIGN PATENT DOCUMENTS 0319164 6/1989 European Pat. Off.

OTHER PUBLICATIONS

Patent Abstracts of Japan vol. 6, No. 005 (P-097) Jan. 13, 1982 & JP-A-56 129 975 (Daifuki Co Ltd.) Oct. 12, 1981, abstract.
Patent Abstracts of Japan vol. 12, No. 271 (P-736)28 Jul. 1988 & JP-A-63 053 513 (Hitachi Ltd.) Mar. 7 1988, abstract.

Primary Examiner—Donald T. Hajec
Assistant Examiner—Esther Chin
Attorney, Agent, or Firm—M. Lukacher

[57] ABSTRACT

A bar code label is read by automatically initiated scanning of the bar code symbol by a beam of light, as from a laser in a bar code scanner. Initially, the scanner is operated in a pulsed mode with low duty cycle (5%) pulses. These pulses are reflected from a reflective tape on one side of a detection zone or from an object carrying the label in the beam path. Then (because the beam is not scanning across the code) the reflected pulses (which are detected much like the bars and spaces of the code) are not detected. The ratio of the number of generated pulses to the reflected pulses is computed for a succession of pulses (ten pulses for example). If this ratio exceeds two (i.e., that the number of effective bars is less than the number of generated pulses during the succession), then the presence of the object is detected and the system, implemented in an application program in the microprocessor controller of the bar code scanner, initiates scanning of the bar code. Upon the detection of the code (a good read) or under conditions where the object is removed before a good read, or is not removed after a good read, the scanning mode is discontinued and the pulsing mode is again initiated. The pulsing mode is initiated continually to test for the presence of a object carrying a bar code label, when not scanning. The pulsing mode is used to detect the presence of a reflective tape or an object.

16 Claims, 23 Drawing Sheets

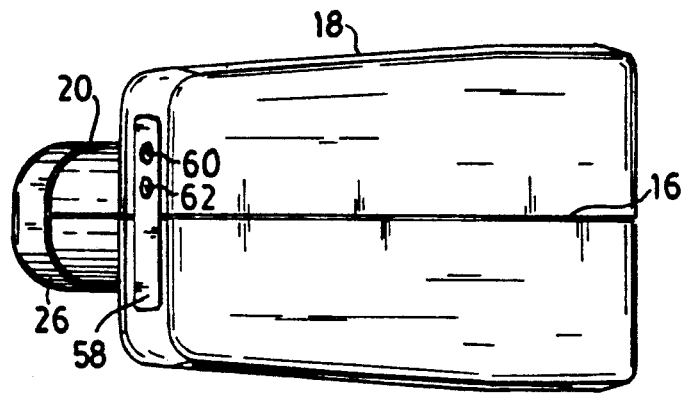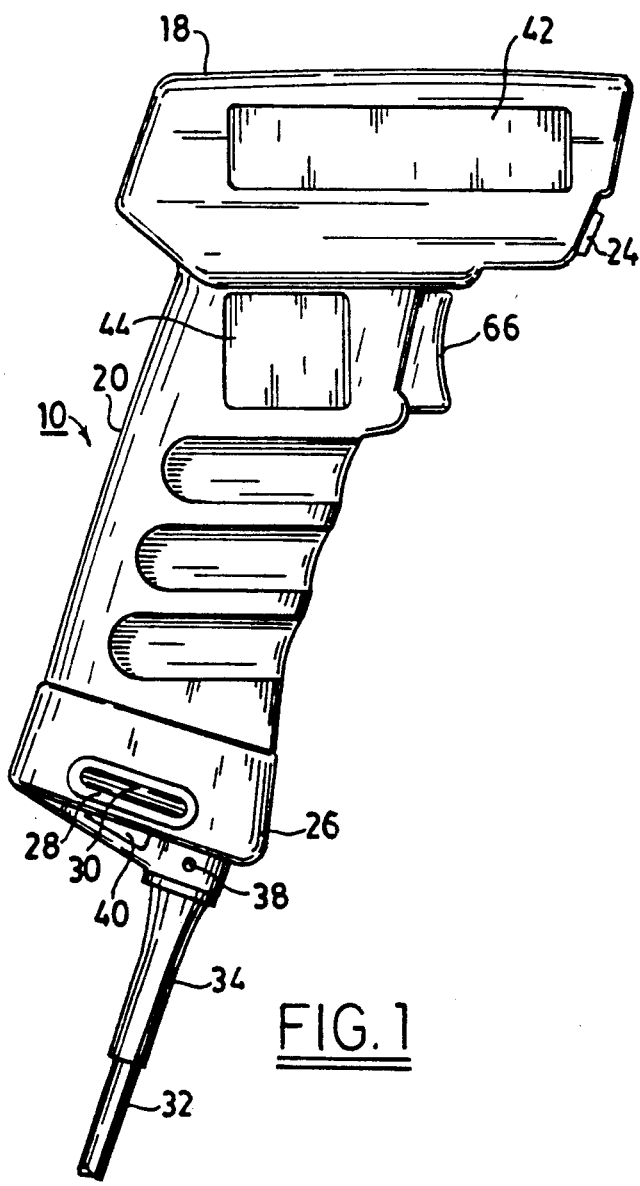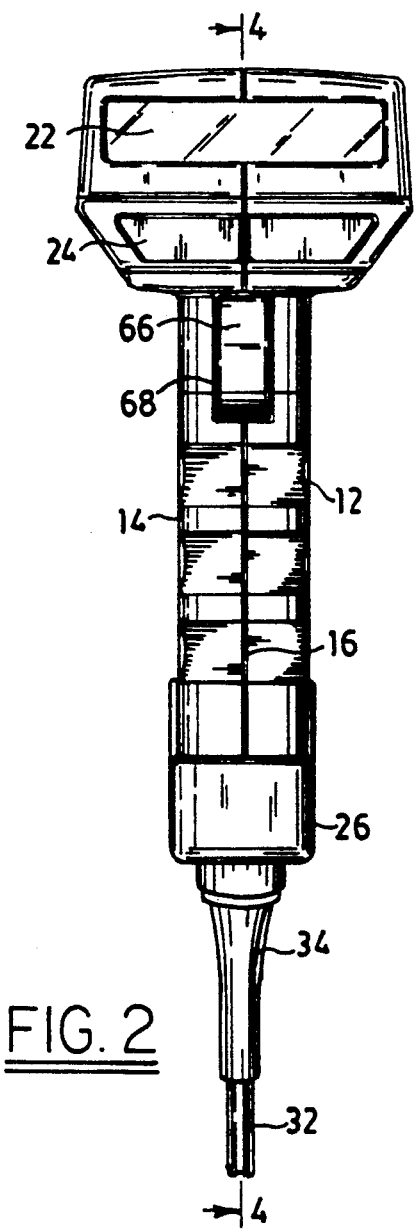

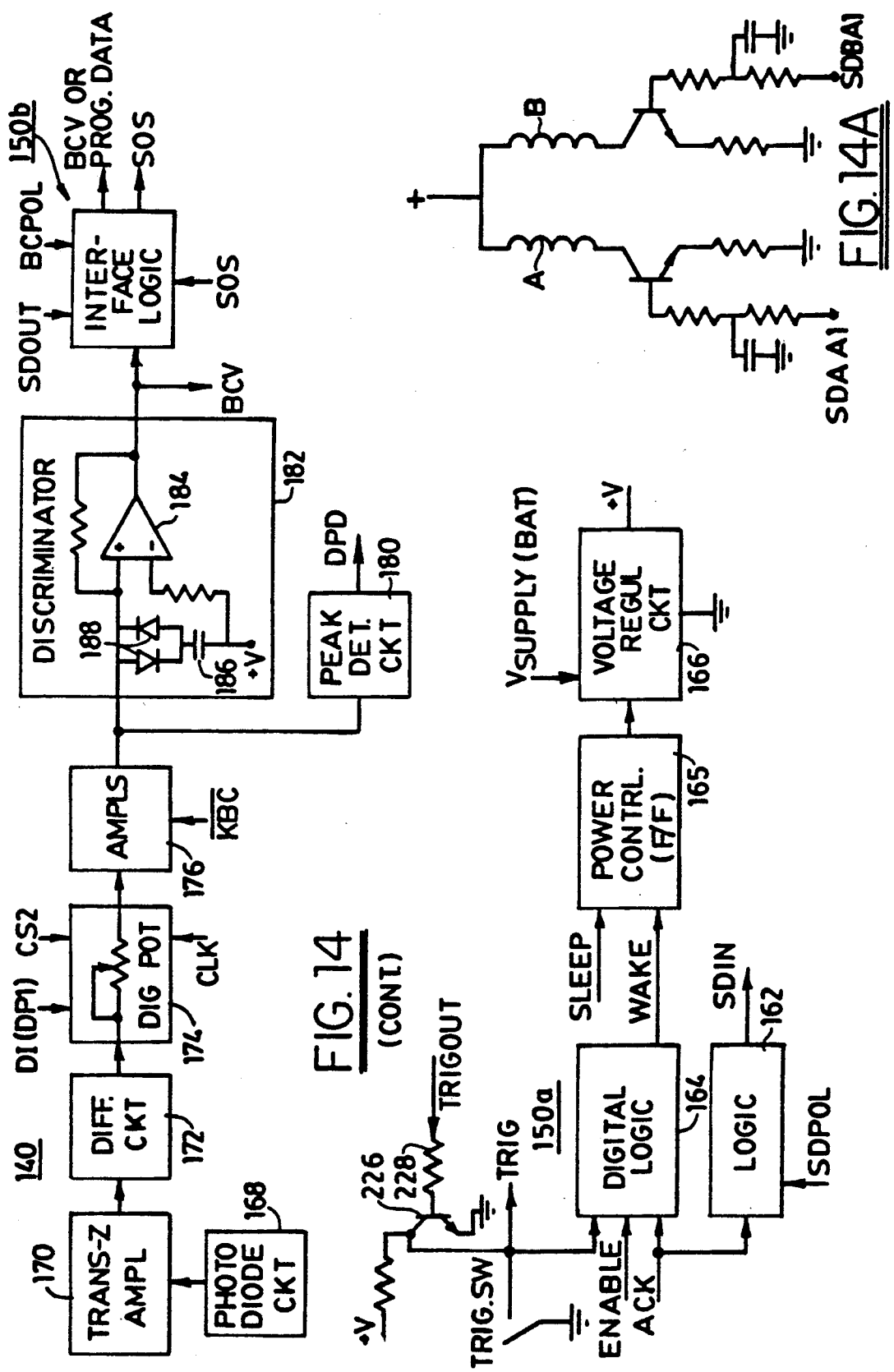

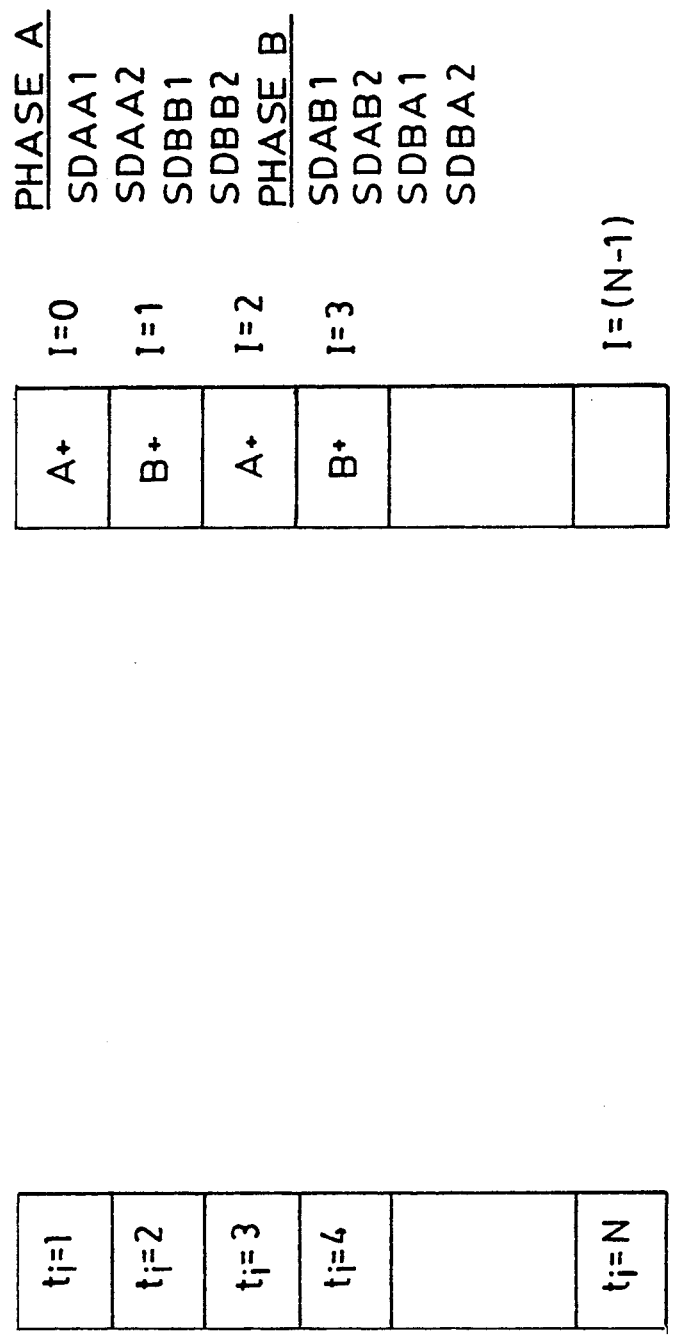

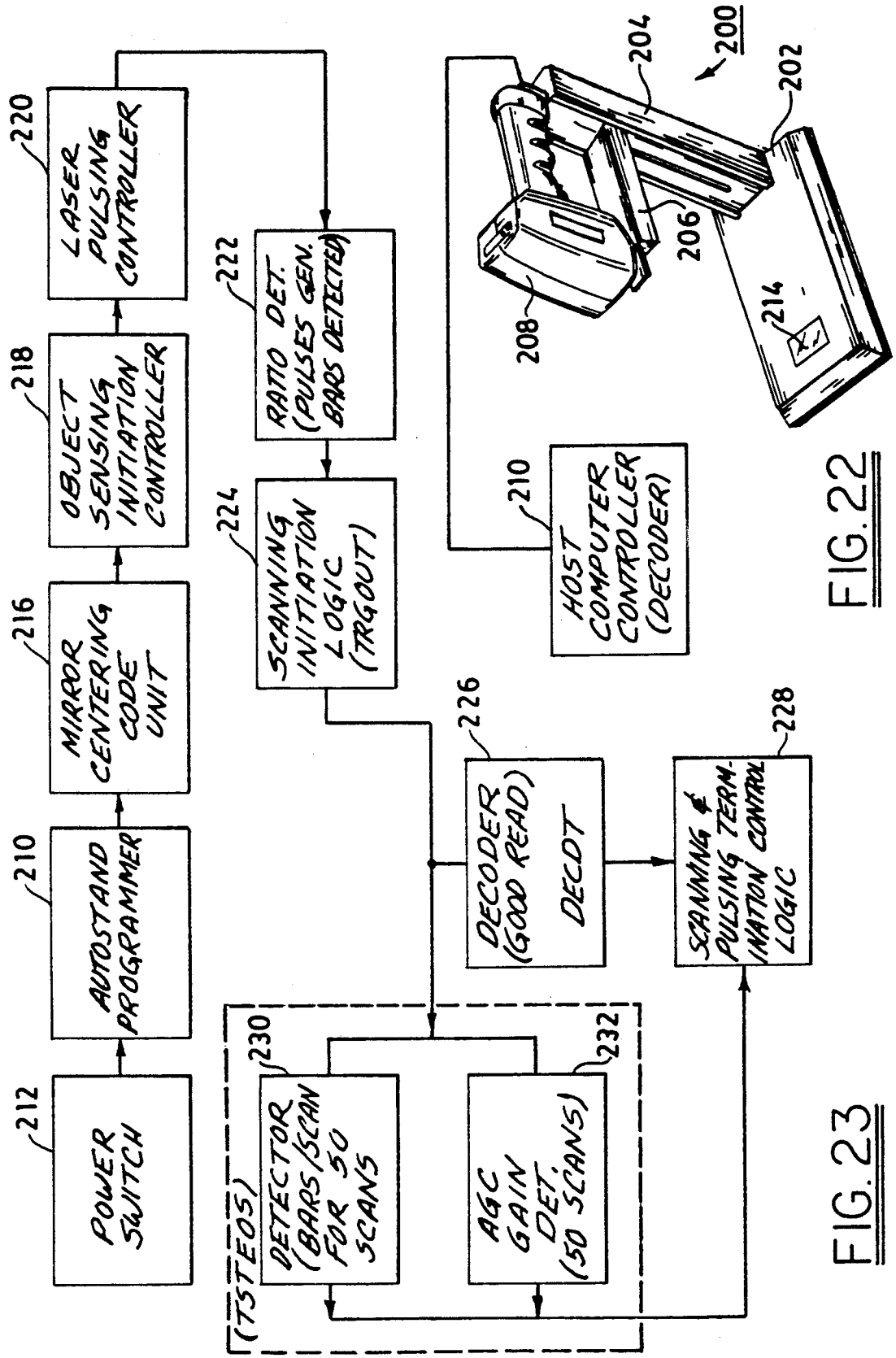

SYSTEM FOR AUTOMATICALLY READING SYMBOLS, SUCH AS BAR CODES, ON OBJECTS WHICH ARE PLACED IN THE DETECTION ZONE OF A SYMBOL READING UNIT, SUCH AS A BAR CODE SCANNER

This application is a continuation-in-part of my application U.S. Ser. No. 07/710,839, filed Jun. 5, 1991.

The present invention relates to a system (method and apparatus) for automatically operating a unit, such as a bar code reader or scanner, automatically and without the need for operator intervention, such as actuation of a trigger, when the object enters the detection zone of the unit.

The present invention is especially for use in symbol (e.g., bar code) reading systems where the reading unit (e.g., a bar code scanner) is mounted on a stand, e.g., a desk top stand, which holds the unit above the base of the stand, defining a region where an object carrying the symbol containing information concerning the object can be located in order to read the symbol. Thus, hands free scanning of bar codes and other symbols is triggered automatically to operating the unit when an object is placed in the reading region. Features of the invention are especially adapted for use with bar code scanners which generate a laser beam and scan the laser beam across the bar code. The invention is also applicable for other symbol reading units, such as those which effectively scan a symbol with a photodetector array (e.g., a CCD array). The invention provides the option for the operator to use a scanner either as a hand held scanner or as a fixed station scanner for hands free scanning, and in either case automatically initiates scanning when an object is in the detection zone into which the beam from the scanner is directed.

Automatic actuation of bar code scanners when mounted on a stand has heretofore involved the use of "electric eye" devices which have separate lamps and photodetectors which detect the presence of an object passing over the base of the stand and under the scanner. See, Swartz, U.S. Pat. No. 4,369,361 issued Jan. 18, 1983 and McMillan, U.S. Pat. No. 4,766,297 issued Aug. 23, 1988. A device called the AutoStand scanner is available from Photographic Sciences Corporation, Webster, N.Y. USA 14580-0448 wherein a photodetector automatically triggers the scanning of a bar code on an object which interrupts light emanating from the base of the AutoStand unit. It is desirable to utilize the light source (e.g., the laser or laser diode) and the digital electronic control facilities in systems, particularly hand held digitally controlled systems, for scanning and reading bar codes and other optically discernible symbols automatically (hands free operation) in fixed station applications, as when the scanner is mounted in a stand, thereby providing an improved AutoStand system. It is also desirable to avoid active circuits such as light sources and photodetectors for sensing the presence of an object having a symbol (a bar code) to be read and to utilize the facilities, particularly the digital and analog circuits and the computer in the scanner unit for object detection and scanning initiation.

Accordingly, it is the principal feature of the invention to utilize the light beam generating and reflected light detection facilities in the symbol reading unit (the bar codes scanner) in target detection and target reading modes which can be executed under the control of computer facilities which are contained in a bar code scanner for automatic scanner operation when the computer is programmed therefor. The modes are integrated with each other and obviate false reads or user errors such as pulling the object and symbol out of the detection zone under the scanner before the code thereon can be read or not removing the object after the code thereon is read, to obviate erroneous, or redundant and duplicative readings.

Briefly described, the invention is operative for detecting the presence of a target (an object) having a symbol representing information concerning the object by utilizing the light beam projected from a symbol reader unit, when the object is placed into the path of the beam in a reading region or space. The system operates in a pulsing mode and in a reading (e.g., scanning) mode. Initially the light beam is pulsed and directed towards a reflector along a path between the unit and the base of a stand which carries the unit, in the region into which the object may be placed. This path is blocked by the object when the reading of the symbol thereon is desired. The reader unit has means for detecting when a first number of pulses in a succession of pulses which are directed toward the reflector exceeds a second number of pulses in the succession which is reflected by the reflector. The presence of the object is indicated in accordance with the ratio of the first number to the second number. Means are provided for then initiating reading of the symbol. Upon decoding of the symbol information (a good read) or upon occurrence of events, such as premature removal of the object from the detection zone or allowing the object to remain in the detection zone, the scanning mode is terminated. The pulsing mode is initiated continually when the unit is programmed for automatic reading and scanning operations. The detection of the presence of a symbol bearing object can be obtained without the use of a reflector when the second number of pulses when reflected from the object exceed a first number of pulses which are not reflected. The means for reading the symbol is then operated.

The pulsing mode and the reading mode are preferably implemented under computer control using the computer facilities of a scanner/reader equipped with such facilities. A bar code scanner containing a digital control system utilizing a microprocessor computer is the subject matter of U.S. Pat. application Ser. No. 07/652,158 filed Fe. 7, 1991 in the names of Jay Eastman, Anna Quinn, Scott Grodevant (the inventor hereof) and John A. Boles, now U.S. Pat. No. 5,200,597, issued in Apr. 6, 1993. A system in accordance with the presently preferred embodiment and the best mode now known for practicing this invention incorporates the computer controller and other circuits and mechanisms of the hand held bar code scanners described in the above-referenced application. Drawings and description of the above-identified application revised to set forth the new technology provided by the present invention are FIGS. 1 to 21 hereof; the revisions being in FIGS. 14, 15 and 18 hereof The present invention is shown and is described principally in connection with FIGS. 22-28 hereof.

In the accompanying drawings;

FIG. 1 is a side view of the bar code scanner and reader system as shown in the above-referenced application, the system containing, principally in its circuitry and its computer programming the technology which is provided in accordance with the presently preferred embodiment of this invention;

FIG. 2 is an end view from the right of the scanner/reader system shown in FIG. 1;

FIG. 3 is a top view of the scanner/reader system shown in FIGS. 1 and 2;

Figure 14:
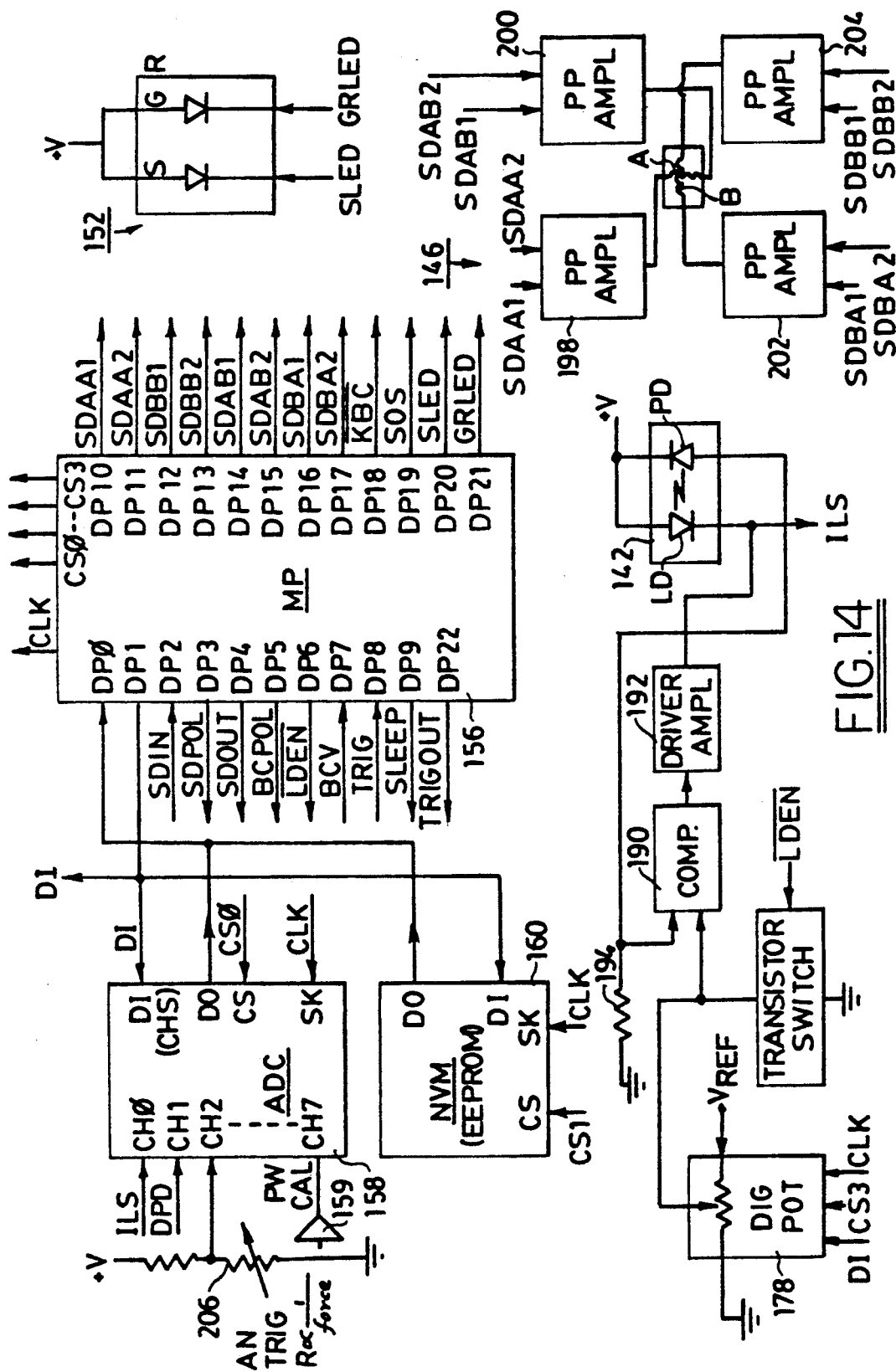
Figure 15:
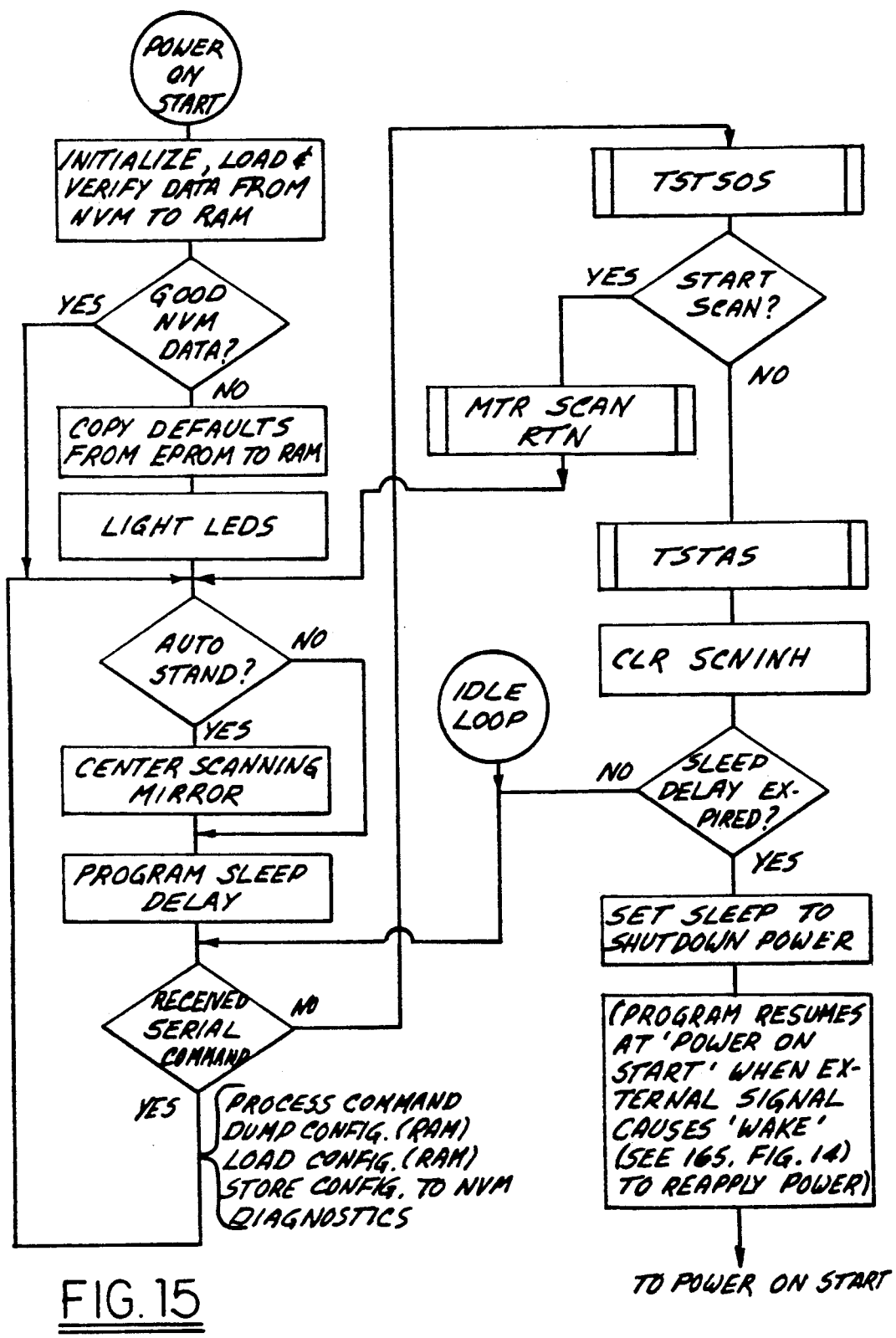
Figure 16:
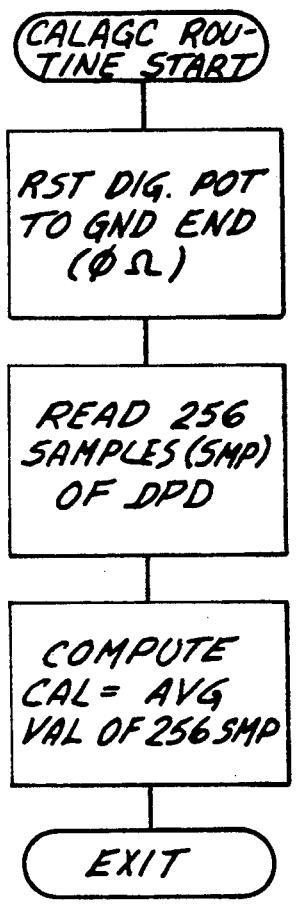
Figure 17:
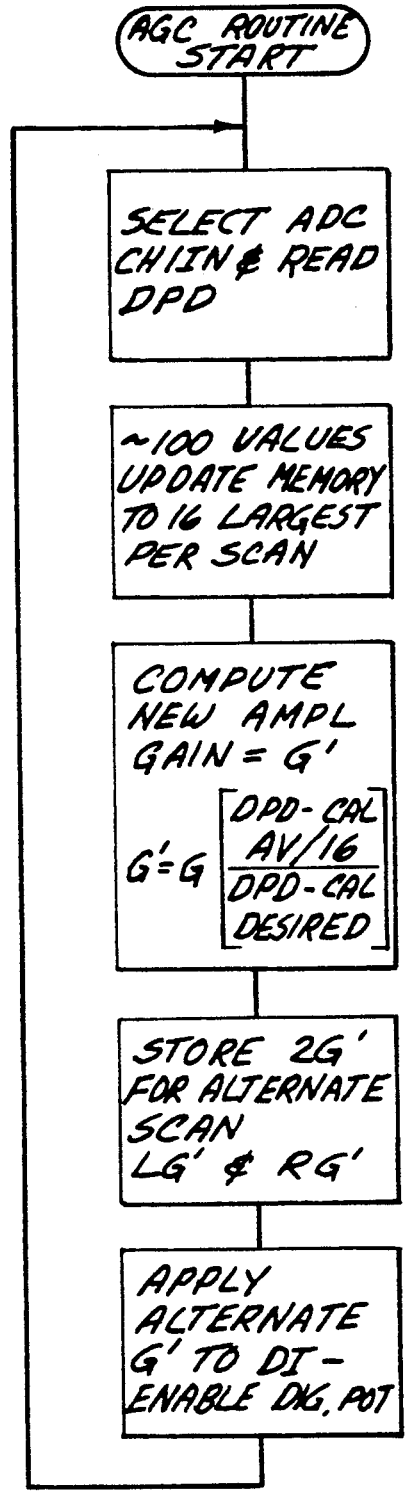
Figure 18:
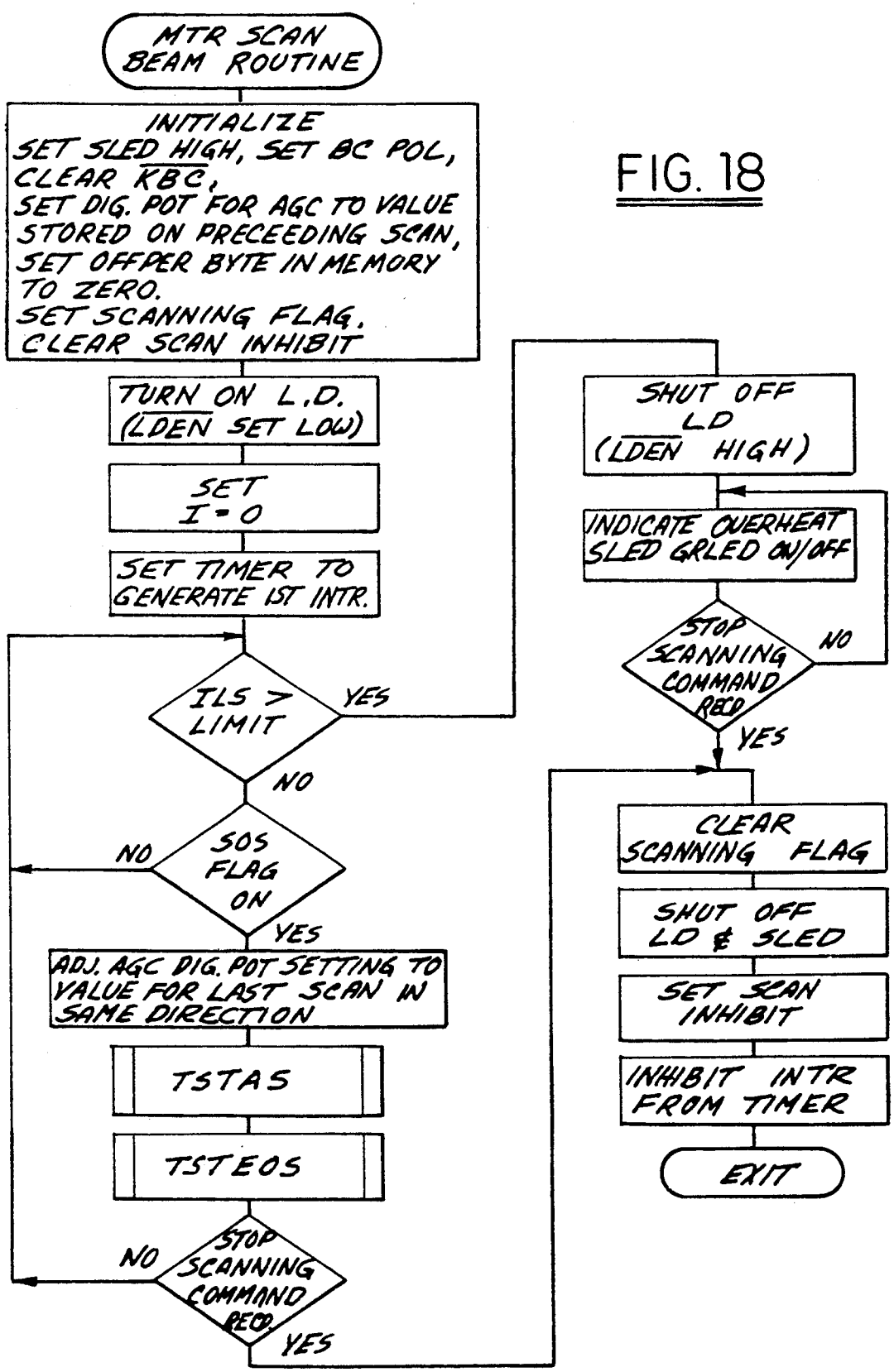
Figure 19:
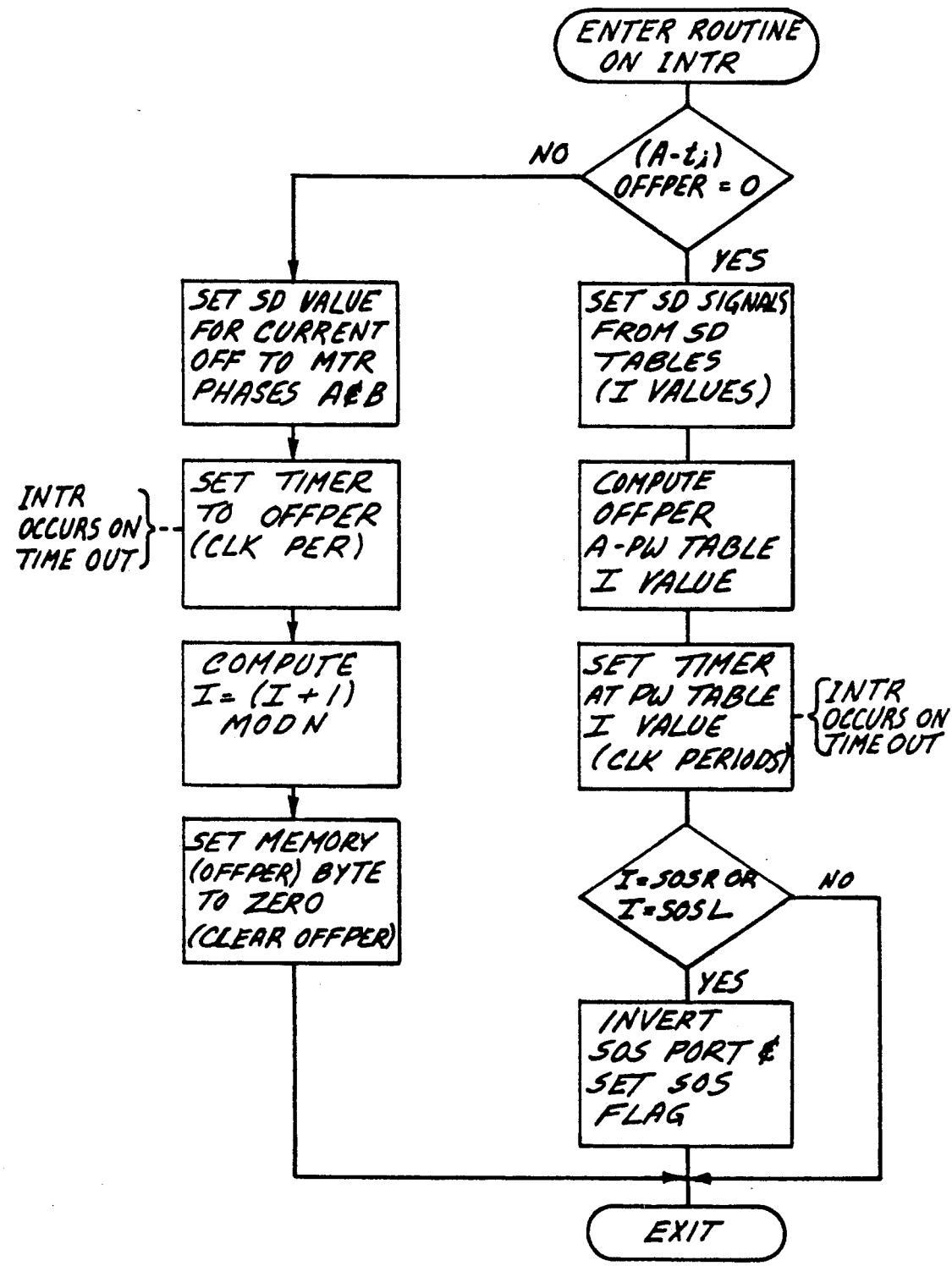
Figure 24:
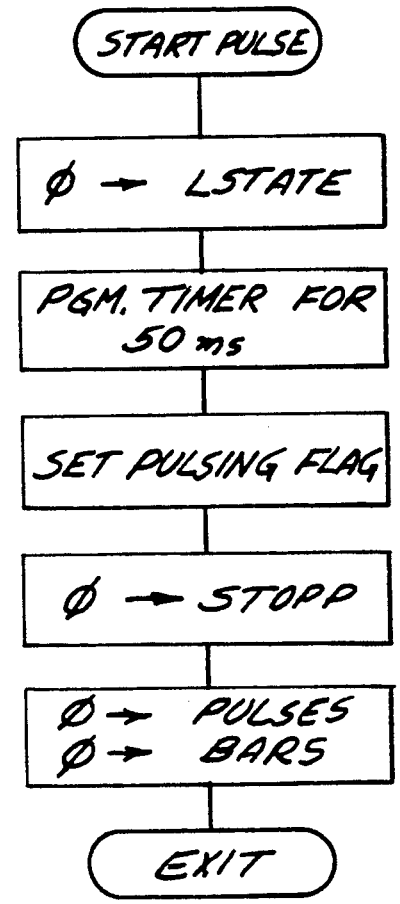

FIG. 14 (which is shown in two parts, 14 and 14 (Cont.) is a block diagram of the electronic system of the scanner/reader illustrated in the preceding figures;

FIG. 14A is a schematic diagram of another embodiment of the motor control circuit of the system shown in FIG. 14;

FIG. 15 is a flow chart illustrating the overall programming of the digital computer (microprocessor) of the system shown in FIG. 14;

FIG. 16 is a flow chart illustrating the program utilized in calibration of the automatic gain control codes (CALAGC) of the program shown in FIG. 15;

FIG. 17 is a flow chart of the automatic gain control program of the digital controller;

FIG. 18 is a flow chart of the motor control program (the SCAN BEAM routine) of the program illustrated in FIG. 15;

FIG. 19 is a flow chart of the routine for generating the scan control signals to the scanning motor which is carried on during the SCAN BEAM routine;

FIGS. 20 and 21 are tables of values which are stored in the computer and used in the program illustrated in FIG. 19 for generating the pulse width modulated motor drive pulses;

FIG. 22 is a perspective view illustrating an AutoStand bar code reading system incorporating the invention;

FIG. 23 is a block diagram generally showing the system of the AutoStand bar code reading system shown in FIGS. 22; and FIGS. 24-31 are flow charts of the application program which is installed in the microprocessor computer system of FIG. 14 so as to provide the automatic object detection (pulsing) and symbol scanning modes of operation in accordance with the presently preferred embodiment of the invention.

Referring first to FIG. 22 there is shown a stand 200 having a base 202 and an upright support 204 with a cradle 206 in which the bar code scanner 208 may be placed, when hands free or "AutoStand" operation is desired. The bar code scanner is controlled by a host computer controller 210 which decodes the bar code signal and provides commands which program the bar code scanner 208 for the AutoStand mode of operation. Thus, the host computer 210 serves as the AutoStand programmer (See FIG. 23) and it may supply power or turn on power for operating the bar code scanner 208 from its internal batteries. The power switch (212-FIG. 23) is effectively in the host computer 210. The bar code scanner may be operated in hand and free mode without connection to a host computer, as shown, if programmed permanently for hands free operation.

The design of the bar code scanner 28 is illustrated in FIGS. 1-21 of the drawings. This design is similar to what is shown and described in the above-referenced patent application and is set forth in detail hereinafter in connection with FIGS. 1-21.

Figure 27:
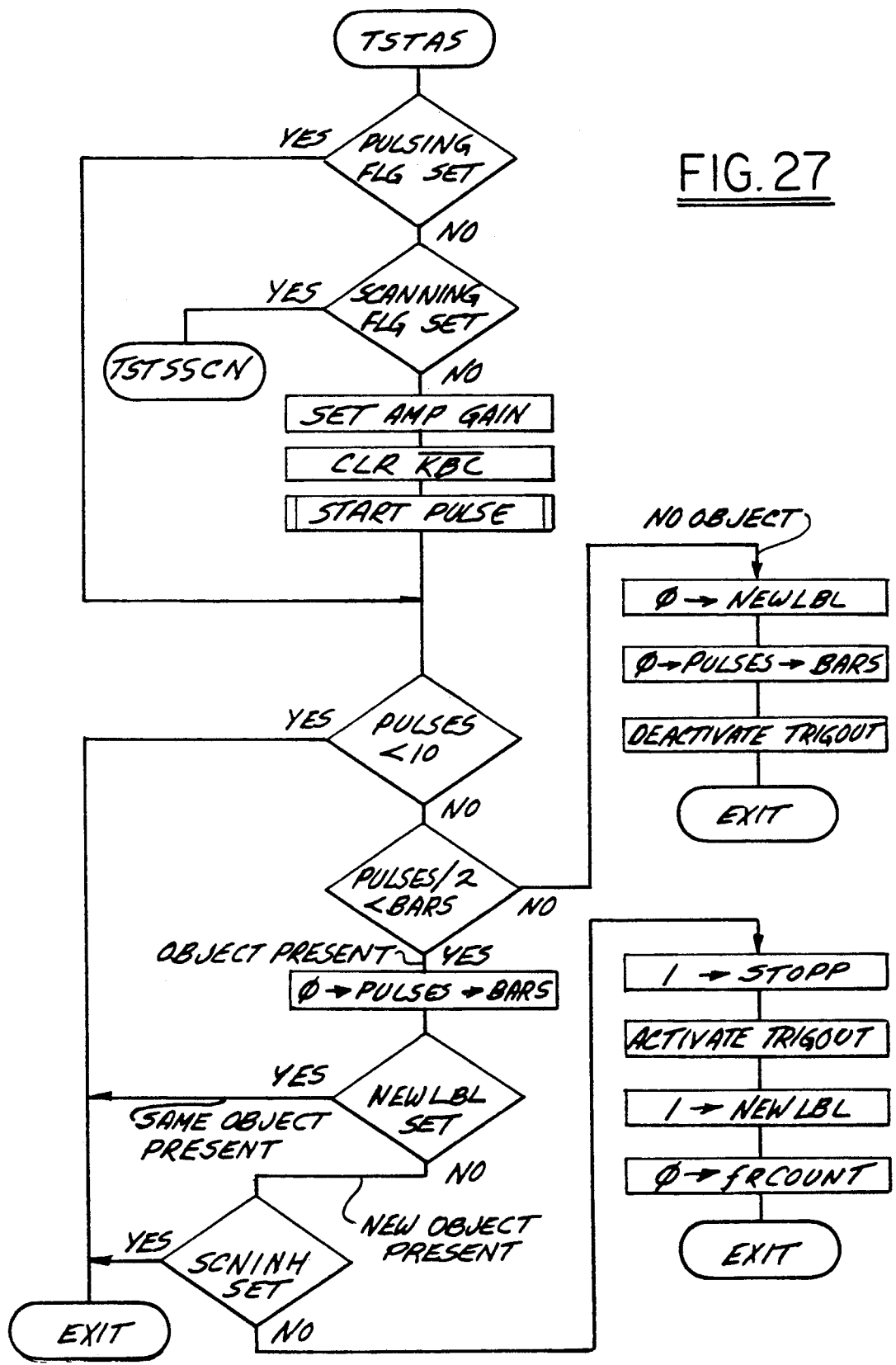
Figure 27A:
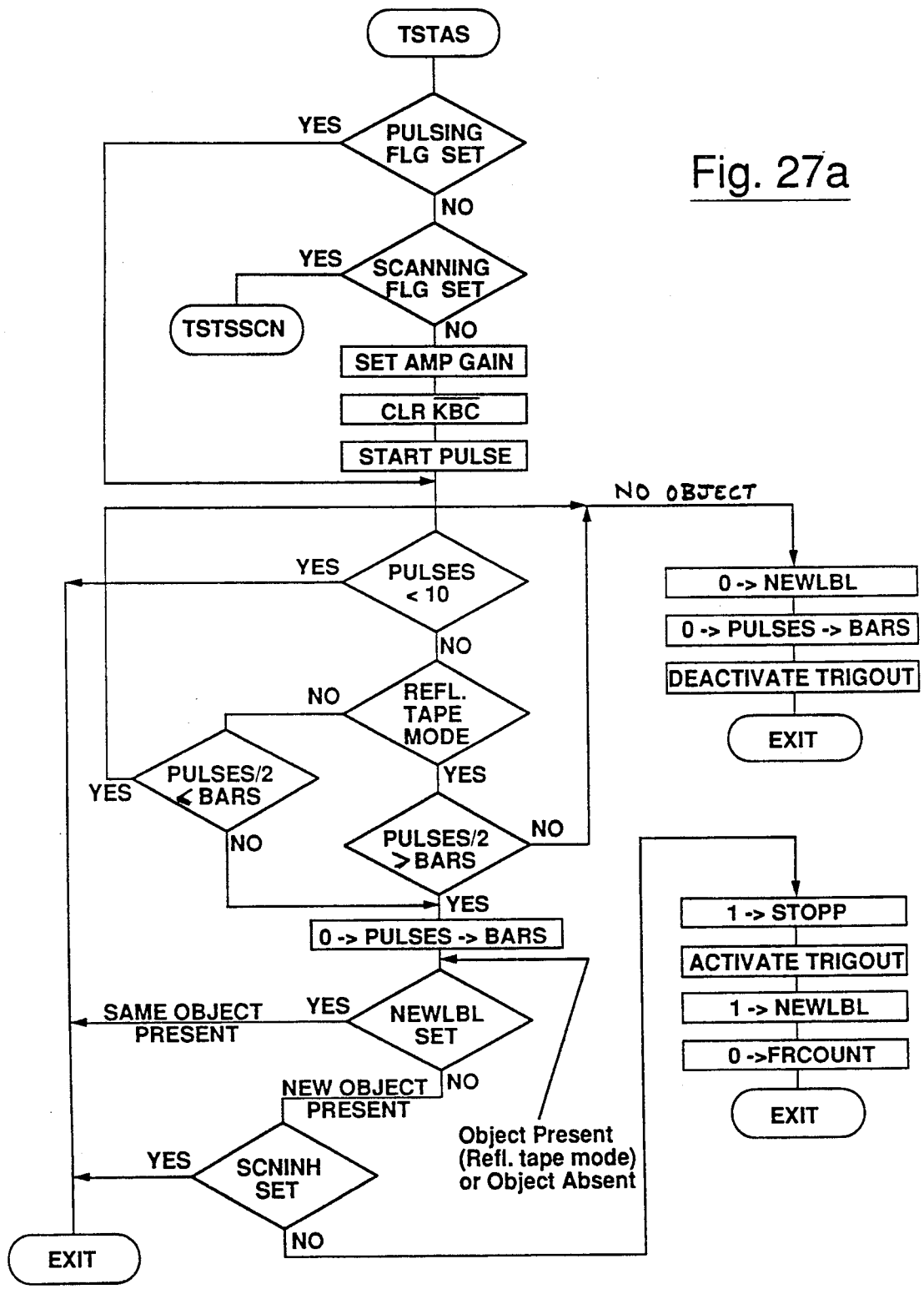

The stand 200 has on the upper surface of its base 202 a reflector in the form of a piece 214 of reflective tape which is adhered thereto. This tape is of the type using corner reflector particles and is commercially available from various sources such as the Minnesota Mining & Manufacturing Company of Minneapolis, Minn., USA. It is the same type of tape that is used in highway warning applications. The tape is disposed so that it is in alignment with the laser beam emanating from the bar code scanner 208 at approximately the center of the scan. The beam is from time to time turned on. Initially the beam is generated in the form of low duty cycle successive pulses. In the preferred embodiment of the invention the duty cycle is approximately 5%. The beam is on, for example, for 2 ms and off for 38 milliseconds (ms); thereby providing a total period of 40 ms, the timing being obtained by microprocessor timer control using a programmable timer (PGM) in the microprocessor of the bar code scanner. A decision is made a short time (e.g., 400 ms) after pulsing commences based upon the number of pulses generated and the number returned (reflected) from the reflecting tape and detected in the bar code scanner detection circuit (182-FIG. 14 cont.). When the system is programmed as shown in FIG. 27a, it can be made operative to automatically initiate scanning in response to reflections of pulses from an object in a detection zone in front of the scanner. The reflector (tape) is not used and the scanner initiates scanning automatically without having to pull its trigger.

An object or target having a bar code label can be placed in a region between the beam outlet window of the scanner 208 and the base 202. The cradle height on the upright support 204 is adjustable so that the largest object can be inserted and removed for hands-free bar code scanning. The return light is of high intensity because of the reflectivity of the tape 214, however, when an object enters the region and blocks the beam, the return light is of much lower intensity and is effectively absent and goes undetected in the bar code scanner. Based upon the number of light pulses generated and the number detected, a decision as to the presence of the object is made. Then the scanning mode of operation is initiated. Scanning continues until a good read is decoded by the decoder of the host computer 210. Then the scanning operations are shut off. Control logic programmed in the bar code scanner's microprocessor ensures that removal of the object before completion of scanning or allowing the same object to remain in the detection region can also stop scanning operations; the latter avoiding redundant reading of the same bar code. The system then goes into an idle mode and the pulsing mode is reinitiated to test for the presence of new objects and/or the removal of the old object. Once "no object" is detected, the system is again conditioned to read another bar code, symbol. The program showing the entry into the pulsing mode for the detection of targets is shown in the FIG. 15 of the drawings. The program step which indicates the pulsing and upon detection of a target the scanning mode is called TSTAS. The process is indicated as enter TSTAS.

Figure 26:
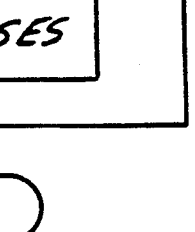
Figure 25:
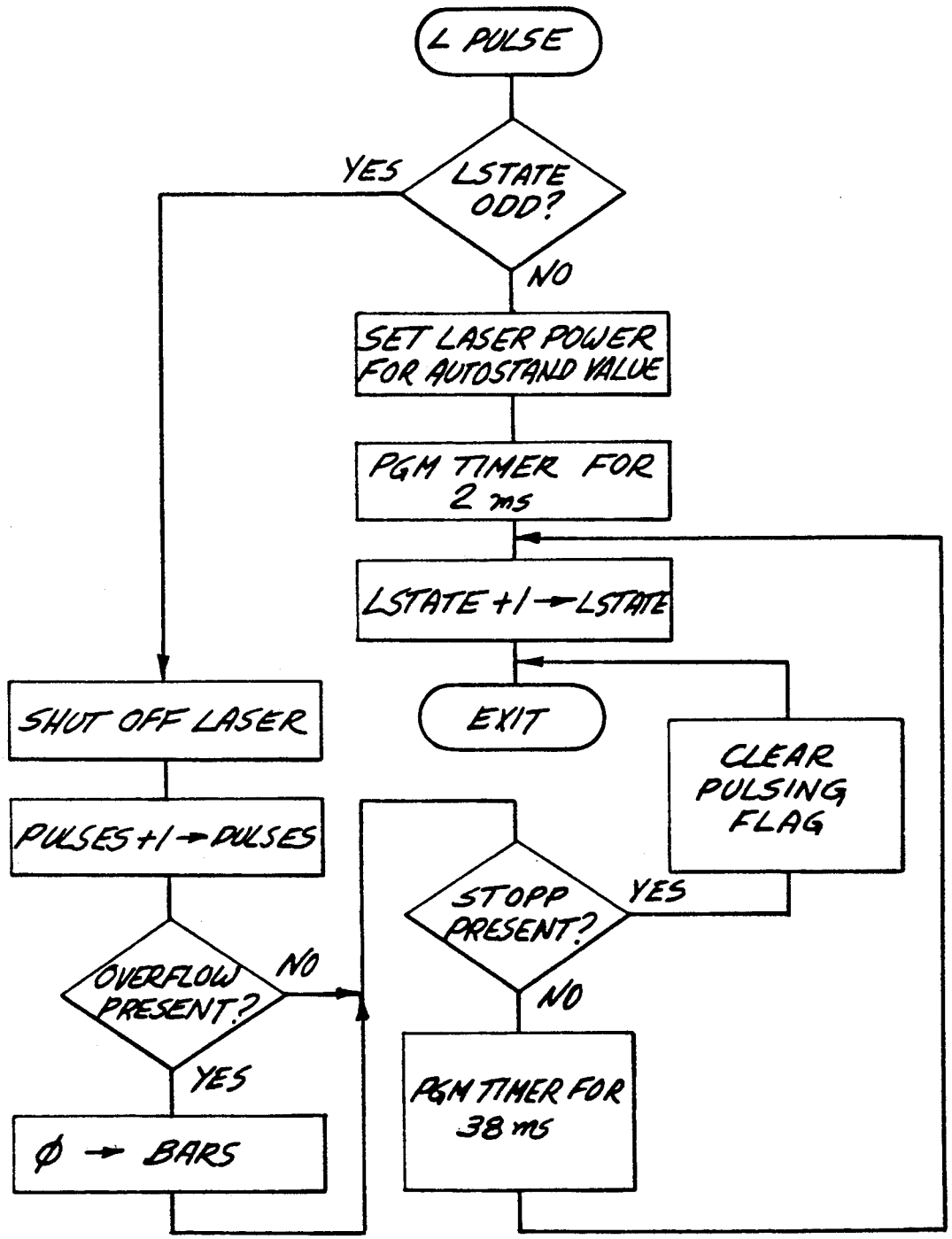

The bar code scanner system for automatic object or target detection and scanning of codes will be more apparent from FIG. 23. The power switch is turned on to enter the system operations which are implemented in the microprocessor of the scanner 208 which is described below in connection with FIG. 14. As an alternative to allowing the pulsing mode to continue for a fixed period of time, the pulsing mode may be programmed for uninterrupted pulsing until the object is detected and the scanning mode begins. Then the power switch may be automatically turned on and off each second to enter the automatic or AutoStand processes which are carried out by the microprocessor. The scanner 208 may be used for normal, portable handheld scanning operations, when removed from the stand 200 (FIG. 22). The mirror 134 which deflects the beam to scan the code during the scanning mode (See FIG. 4) is then centered. This centering operation may be carried out by pulsing the SD ports of the microprocessor 156 (See FIG. 14). In the event that the motor drive circuit of FIG. 14A is used, outputs to the drive transistors which energize both phases A and B of the motor may be simultaneously applied for a short period of time (e.g., 100-400 ms, as required to stabily center the motor/mirror assembly) and the mirror will center. When centered it is in alignment with the middle of the reflective tape 214. The mirror center control unit 216 which is implemented in the microprocessor 158 provides the mirror centering function. The object sensing initiating controller 218 then becomes operative. This controller executes the TSTAS or test AutoStand program which is illustrated in FIG. 26. A laser pulsing controller 220 causes the laser beam to emanate in pulses from the window of the bar code scanner 208. These pulses are either reflected back from the tape 215 as return pulses or, if an object is in the detection zone, are intercepted by the target and blocked.

The return pulses are detected, just as if they were spaces of the bar code. Accordingly, the returned pulses are referred to in the drawings and are described hereinafter as "bars." The TSTAS program also implements a ratio detector 222 which detects the ratio of pulses generated to bars detected. In implementing the inventive system it is convenient to detect only one edge of the return pulses, i.e., either the rising or falling edge which correspond respectively to a black to white transition and a white to black transition in conventional bar code detection. The detection of one transition thus corresponds to two bars or one reflected pulse. To determine whether an object has intercepted the emanating beam of pulses, the number of pulses divided by two exceeds the number of bars. In effect a ion was detected of the pulses generated to bars ratio is detected of the pulses generated to bars detected If this ratio exceeds a determined value, then an object has intercepted the beam and is positioned for scanning of the bar code label thereon.

Scanning initiation logic 224 is then operated. This is accomplished by the generation of a signal TRGOUT which effectively shorts the trigger switch of the bar code scanner as shown in FIG. 14 cont. The transistor 226 is rendered conductive by the TRGOUT output which is applied to the base of the transistor 226 through a resistor 228. Then the scanning operations are commenced. It is desirable that the TRIG signal be connected to the host computer 210 and then generate an enable signal which is applied to the digital logic 164 and starts the scanning motor routine as described, particularly in connection with FIG. 18 of the drawings. The TRGOUT output is obtained from a data port DP21 of the microprocessor 156 (FIG. 14). Upon reading the code the decoder 226, which as noted above, is in the host computer 210, outputs a good read and asserts a command to scanning and pulsing termination control logic 228 to terminate the scan and wait for the next power switch actuation or time (400 ms) when the object sensing initiation controller 218 starts the process over again.

Figure 28:
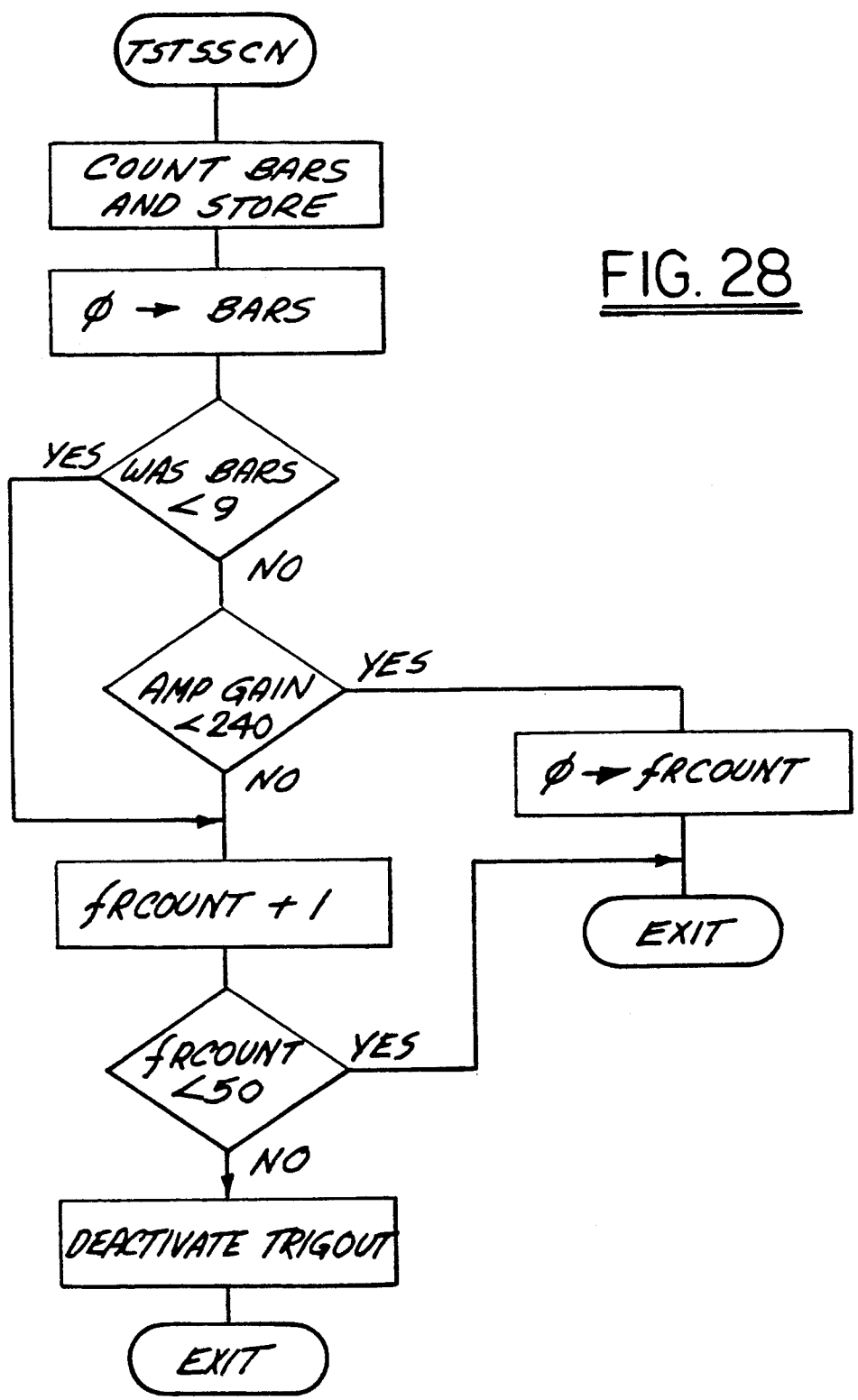

In order to prevent errors, special detectors 230 and 232, which are implemented in the TSTEOS routine, FIG. 28, are used. In addition the detector 222 has logic which makes sure that a second scan of the same object is not repeated thereby eliminating redundant reading of the same label. This detector uses variables in the computer logic called NEWLBL and SCHINH (for new label and scan inhibit, respectively) which assures that pulsing operations occur before scanning operations. This assures that the object is removed so that the object sensing initiation controller 218 initiates the pulsing mode before a label can be read twice without removal of the object on which the label is affixed.

The detector 230 detects the existence of a pre-determined number of bars per scan and for a number of scans which is preferably in the order of 50 scans. The bars now detected are those read from the bar code label. All bar code symbologies presently used must have at least 18 bars. Accordingly, bars divided by two 9 bars corresponding to 18 bars since only one bar edge is detected) if not detected for 50 scans is an indication that the bar code label has been removed before it can be read. If this occurs, the scanning and pulsing termination control logic is operated to stop scanning and wait for re-initiation of the pulsing mode. As a back up, the detector 232 detects the AGC or amplifier gain setting. This is the setting of the digital potentiometer 174 in the amplifier of the scanner (See FIG. 14 cont). This value is high when the gain is low due to the object being removed because of the high intensity of the return pulses which are reflected from the reflective tape 214 (FIG. 22). If the value of the AGC function is high (gain of the amplifier is low), this is an indication that the object has been removed before the bar code has been read, because the beam emitted from the scanner is reflected from the high reflectance tape 214. Accordingly, if the detector 232, in 50 consecutive scans, reads a high digital potentiometer setting, the scanning and pulsing termination control logic 228 is commanded to stop scanning. Upon stopping of scanning the laser in the scanner 248 may be turned off to await the next cycle of operation.

Referring next to FIGS. 1, 2 and 3, there is shown the hand-held scanner/reader 208 for bar code symbols. A housing 10 contains the electronics and optics of the unit. It is a bi-part housing having right and left halves 12 and 14 which are assembled together along a parting plane 16 where the halves interconnect. The housing has a head portion 18 and a handle portion 20. The front of the head portion has an opening in which a window 22 of transparent material is disposed. The scanning beam is projected out of this window towards the bar code and light scattered by the code is returned to the window to be detected and processed by the optical and electrical components within the housing 10.

The head portion 18 has an indentation 42 for a label. Another indentation 44 in the handle can also receive a label.

The front of the head portion 18 also carries feet 24 of elastomeric (rubber) material which provides a rest for the scanner/reader unit on the feet 24 and at a point at the end of the handle 20 where an end cap 26 is attached. The end cap is a cup shaped member having an opening 28 through which a detent catch 30 extends to latch the end cap on the end of the handle 20. An electrical cable 32 protected by a grommet 34 which may be part of a strain relief for a male part of a modular connector 36 contained within the grommet which connects the wires in the cable 32 to the female part of the modular connector 36 (see FIG. 4) in the end of the handle. The modular connector may be released by inserting a pin through an opening 38. Another opening 40 provides access for a chain or rope from which the unit may be hung for ready access by the operator.

The rear end of the head portion is adapted to receive, in an indentation 46 therein having holes 48 in which catches are formed (see FIG. 12), a block or strip 50 with openings through which indicator lamps 60 and 62 extend. These lamps extend through a slot 64 in the rear end of the head 18 (see FIG. 12). The lamps 60 and 62 may be light emitting diodes (LEDs) which indicate that scanning is going on by being illuminated in one color (e.g., amber) while the other LED 62 may be of another color (e.g., green) to indicate that a bar code symbol has been successfully read. The strip may contain a connector for a display module (for example using a liquid crystal device) which reads the bar code message or other data (for example during self test using self test routines entered on receipt of command codes from the host computer or terminal associated with the scanner) which is generated in the operation of the scanner/reader unit or in the testing thereof. The display module attaches to the scanner via catches that engage holes 48.

The handle portion has a trigger button 66 which is movable into and out of a hole 68 and operates a switch or variable resistor device which can switch the unit on or off and can control the length of the scan so as to aim and position the beam for scanning desired codes; for example, one of several codes which may be printed closely adjacent to each other on the side of a package or a sheet containing bar codes.

Referring to FIGS. 4 through 6, 12, 12A, 13 and 13A, the design of the housing 10 will become more apparent. The housing halves 12 and 14 are held together by screws 70 which are threaded into posts 72. There are similar posts with holes therethrough in the left housing half 14. The trigger 66 is a bell crank which is journaled on a pin 74 surrounded by a sleeve 76 to form a re-entrant structure which provides a long path and acts as a shield for static electricity from the outside of the unit into the inside of the unit where the electronic circuitry is disposed, thereby protecting that circuitry against adverse affects of static electric discharge. A nose 78 of the bell crank trigger 66 engages a spring biased switch button 80 which biases the button 66 outwardly of the housing to the position shown in FIG. 4. This nose is rigid and has a gusset 79 to insure that there is no flexure thereof. The switch generates a trigger command in the electronics when it is actuated.

Figure 13:
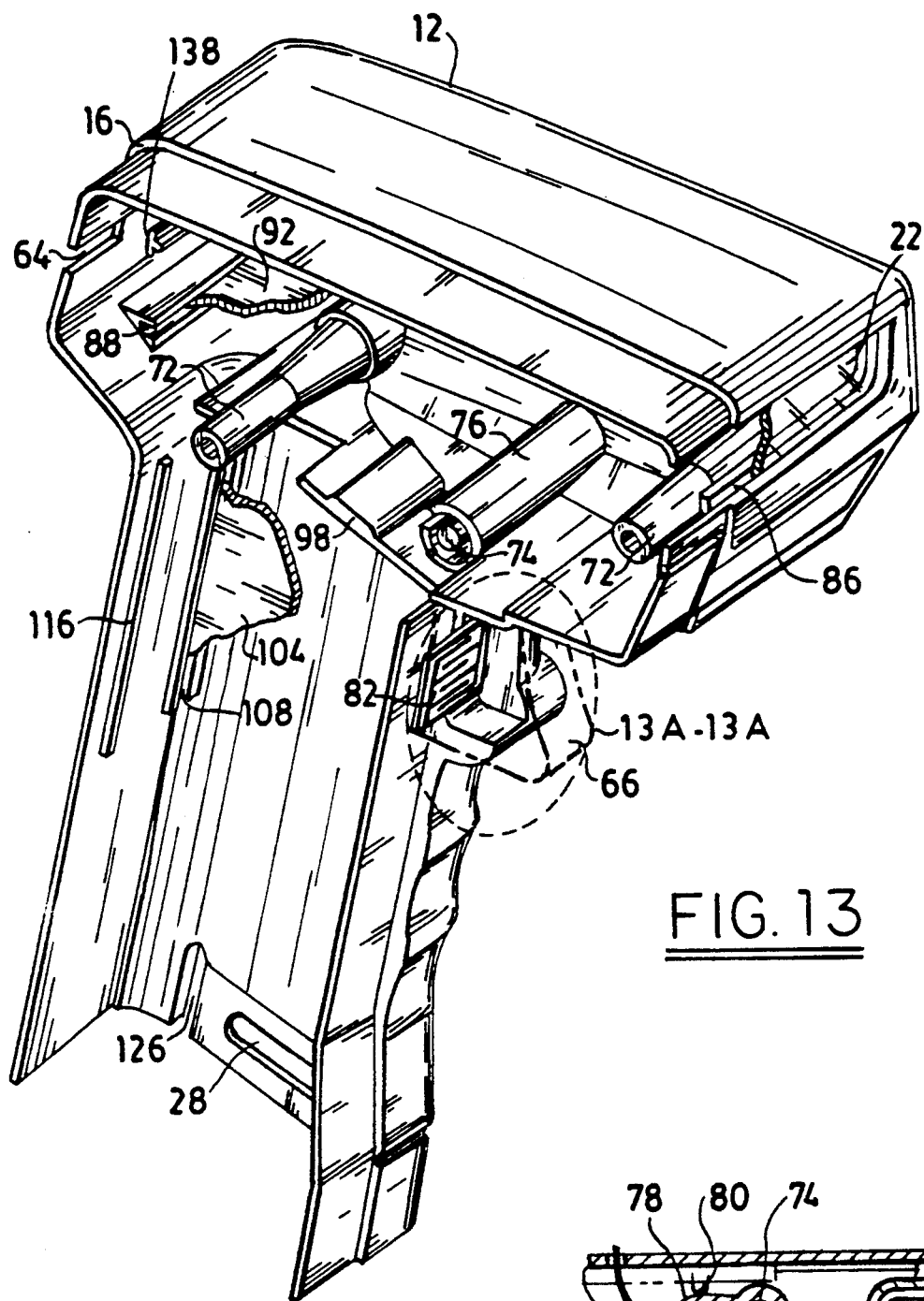
FIG. 13 is a prospective view of the housing half shown in FIG. 13 when viewed from the front.
Figure 13A:
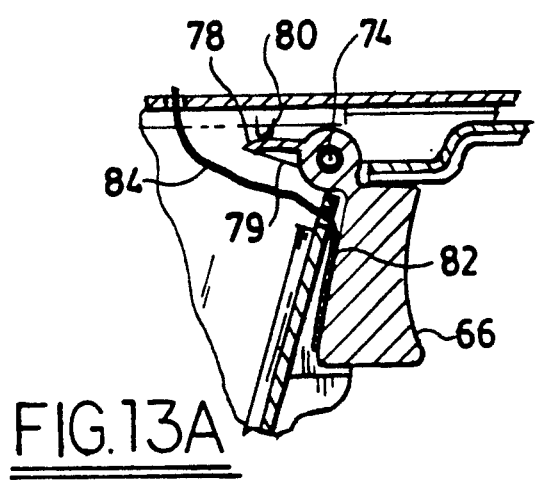
FIG. 13A is an enlarged sectional view of the area inside of the lines 13A—13A in FIG. 13.

Attached either to the inside of the trigger button (as shown) or to the outside surface of the handle which is opposed to the inside surface of the trigger button is a pad 82 of variable resistance material, the resistance of which decreases as a function of the pressure or force applied by the operator when he or she pulls the trigger. A device known as a force sensing resistor obtainable from Interlink Electronics of 1110 Mark Avenue, Carpinteria, Calif. 93013 may be used as the pad 82. The pad has leads 84 which extend to the electronics of the unit. The arrangement is shown in FIG. 13 and 13A. It will be understood that the use of a variable resistance pad is optional, but desirable when the length of the scan across the code is to be manually variable. This trigger is of course not used in hands-free "AutoStand" operations as described in connection with FIGS. 22 and 23 above.

Figures 12, 12A:
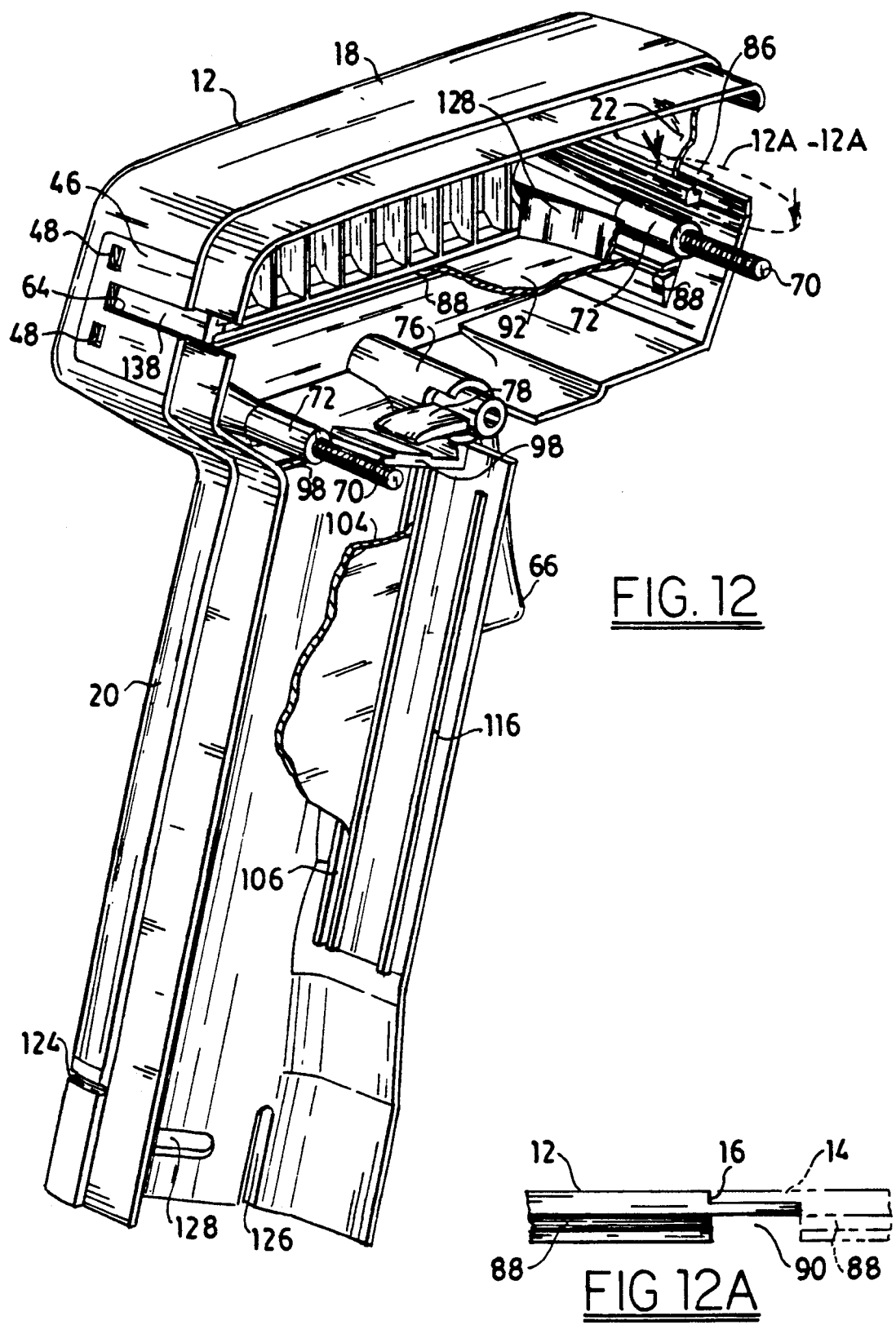
FIG. 12 is a perspective view illustrating one of the halves of the housing or casing of the scanner illustrated in FIGS. 1 through 6 when viewed from the rear.
FIG. 12A is an enlarged sectional view of the area inside the lines 12A—12A in FIG. 12.

The parts 12 and 14 of the housing are coped at the parting plane 16 to define an overlapping joint best shown in FIG. 12A. This joint provides a long discharge path for static electricity and serves to shield the electronics within the housing.

The front end of the housing has ribs 86 which define a channel for securing the window 22. On the inside surface of the head portion 18 there are provided tracks which define a generally U-shaped channel 88. In the right hand head portion 12 shown in FIGS. 12 and 13, the ends of this channel 88 are spaced inwardly from the parting plane 16. There is a gap 90 (FIG. 12A) between the ends of the channel in the halves 12 and 14 of the housing. In the channel 88, there is disposed a printed circuit board 92 which carries the optical and electronic components of the scanner/reader unit. This board, with the components thereon, are inserted in one of the halves in the channel 88 therein and then, as the housing halves are assembled, into the channel in the other half of the housing. No shock mounts are used to support the board and its opto/electronic assembly. It has been found that this arrangement supports the assembly in a manner to prevent damage from shock loads, for example when the unit is dropped onto the floor.

Ribs 94 extend along the roof of the head portion and serve to deflect ambient light which may enter the head portion through the window 22 away from the light collection components of the electro-optic assembly. Ribs 96 on the sides and top of the head portion and stiffen it against deflection and serve as light baffles. The bottom of the head portion has an internal shelve 98 in which a male multi-pin connector 100 is fixedly disposed (see FIG. 4). This connector is wired to a male part of another connector 102 which is attached to the bottom of the printed circuit board 92 via a ribbon cable 105. The connections from the cable 32 are made via a printed circuit board 104 in the handle. This printed circuit board has the modular connector 36 at the lower end thereof and the female part of the connector 100 at the upper end thereof.

The handle portion 20 has ribs which define channels 106 and 108 on the forward and rear sides of the handle in which the board 104 is inserted. The board 104 has a notch defining an opening 110 in which a battery 112 is contained. The battery 112 has its terminals in contact with spring contacts 114 on the lower edge of the notch part of the board 104. These spring connectors urge the battery out of the housing when the end cap 26 is removed. To retain the board 104, there is a projecting catch 116 which latches either in a notch in the edge of the board 104 as shown or under the board 104. The modular connector 36 is attached to the lower end of the board 104 and engages a male prong which extends from the cable 32, the male part of the modular connector being formed in and extending inwardly of the housing through the end cap 26.

Figure 4:
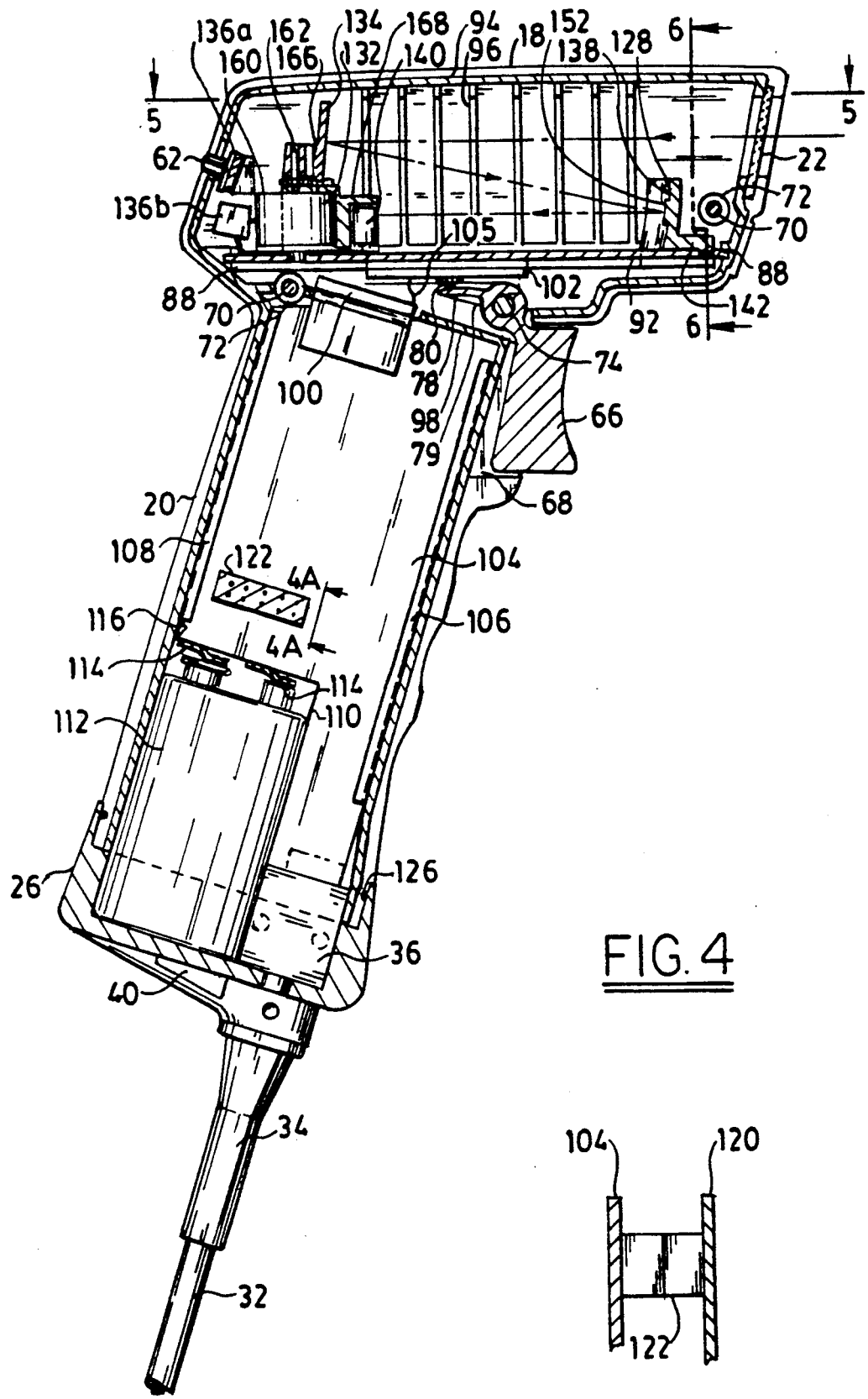
FIG. 4 is a sectional view of the reader shown in FIGS. 1, 2 and 3, the section being taken along the line 4—4 in FIG. 2.
Figure 4A:
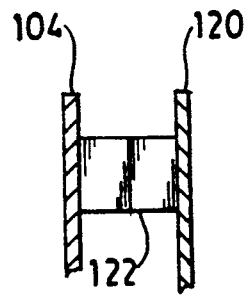
FIG. 4A is a fragmentary sectional view doing the line 4A—4A in FIG. 4.
Figure 5:
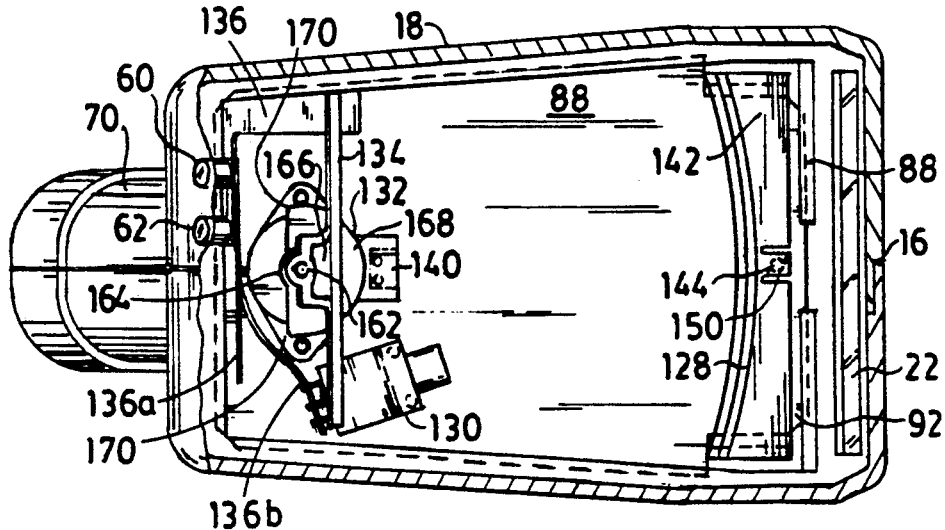
FIG. 5 is a sectional view of the scanner shown in FIGS. 1 through 4, the view taken along the line 5—5 in FIG. 4.
Figure 6:
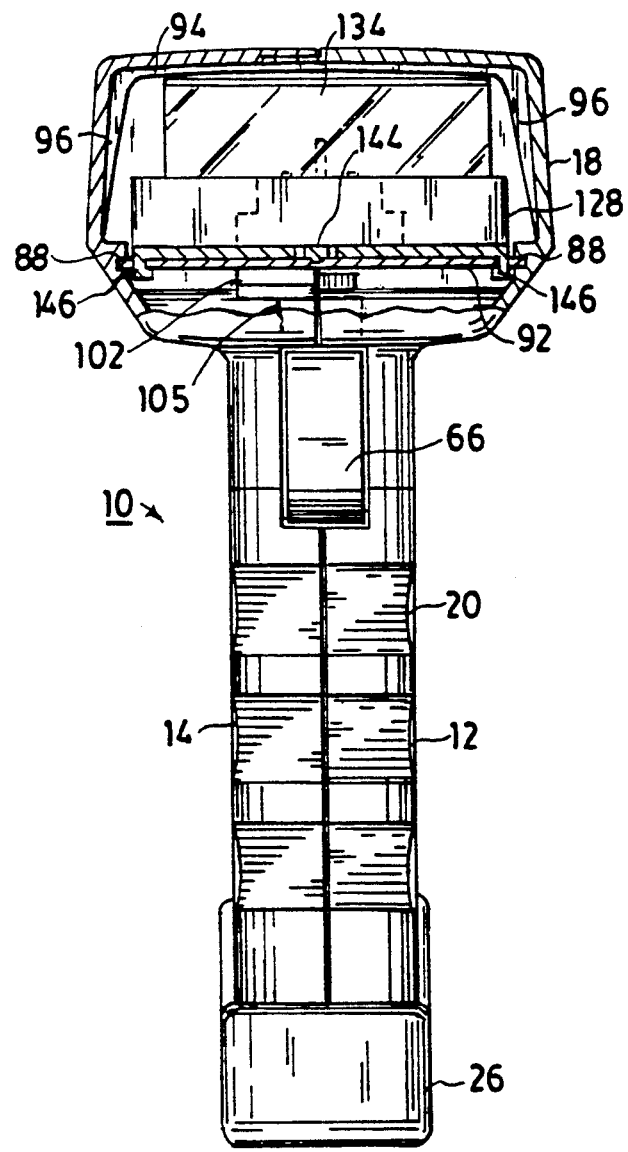
FIG. 6 is a fragmentary sectional end view of the scanner shown in FIGS. 1 through 5, the section being taken along the line 6—6 in FIG. 4.

Another channel for another printed circuit board is provided by a rib 116 in the handle portion 20 of the housing part 12 and an opposed rib (not shown) in the other housing part 14. Another circuit board 120 containing other, optional circuits of the scanner/reader unit forms an assembly with the board 104 when connected thereto via a bridging connector 122 (see FIG. 4A). Then both boards 104 and 120 are desirably inserted at the same time into the assembled housing when the end cap 26 is removed.

The housing parts are preferably made of plastic material, such as polycarbonate or ABS. A groove 124 in which an elastomeric seal 126 may be located seals the open end of the handle 20. The sides of the handle 20 are formed with grooves 126 (see FIGS. 12 and 13) which renders the lower, end of the handle flexible so that the boss 30 can flex outwardly through the hole 28 and act as a detent catch to hold the end cap 26 in place, with contact made in the modular connector 36 and with the battery 112 held in place.

The optical and electrical assembly on the printed circuit board 92 has as its major components, in addition to the board 92; a collection mirror 128, a laser diode assembly 130, a photodetector and scanning motor assembly 132, and a beam deflector in the form of an oscillating or dithering mirror 134. A flexible printed circuit board 136 is connected to the board 88 and extends upwardly behind a holding member 138 (FIGS. 12 and 13). The flexible board 136 carries on one leg 136A or a pair of legs 136A & B, the LEDs 60 and 62, and a connector (not shown) which extends through the slot 64 for connection of the LCD display (if such a display is used). The flexible board 136 is folded much like a ribbon inwardly of the board and then outwardly. The leg 136B have wiring which is connected to the laser diode in the laser diode assembly 130 and the motor in the photodetector motor assembly 132.

The mirror 128 has a spherical reflecting surface 138 which faces the photo diode 140 in the assembly 132. This mirror 128 has a base 142 with a flexible tab 144 and side flanges 146 which form rabbett joints with the side edges of the board 88. These edges are coped inwardly so as to provide clearance for the flanges 146. The tab 144 is flexural and acts as a detent latch which latches in an indentation 150 in the board. The positioning of the mirror is not critical because the outgoing and return beam extend over conjugate paths so that positioning errors are automatically compensated. The center of the mirror has a planar facet 152 which deflects the beam from the laser diode to the mirror 134. The mirror receives the scattered light returned from the code as the oscillating mirror 134 scans, collects that light and directs it to the photo diode 140.

The motor assembly 132 includes a motor 160 having a shaft 162. The mirror 134 has a rear bracket 164 with a vertical slot 166 so as to enable the mirror, which may be plastic material, to be force-fit onto the shaft 162. The motor 160 and the photo diode 140 are assembled by a cover 168 which has flanges 170 which are rivetted or screwed to the board 92.

Figure 8:
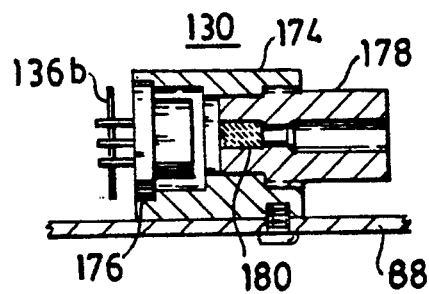
FIG. 8 is a sectional view illustrating the laser diode and its optical assembly, the laser diode being mounted on the printed circuit board of the scanner shown in FIGS. 1 through 6 and schematically in FIG. 7.

The laser diode assembly 130 is shown in greater detail in FIG. 8. It includes a barrel 174 which is attached as by screws to the board 88. A laser diode 176 is positioned in the rear end of the barrel 174. A lens assembly 178, including a gradient index lens 180, is screwed into the barrel 174. The orientation of the laser is such that the long dimension of the laser beam is generally parallel to the plane of the board 92 thereby utilizing diffraction for orientating and shaping the beam which is incident on the code, as described in detail below.

Other circuit components, including a microprocessor chip, which are discussed in greater detail hereinafter in connection with FIG. 14, are mounted on the board 92. They are not shown in FIGS. 4, 5 and 6 in order to simplify the illustration.

Figure 9:
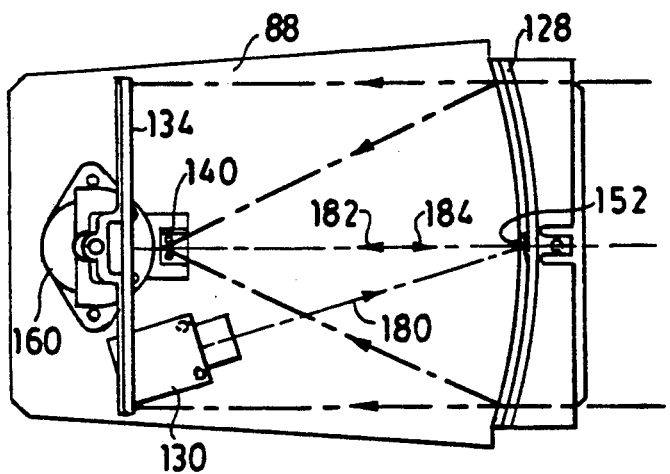
FIGS. 9 through 11 are diagrammatic views illustrating the operation of the optics of the scanner shown in the preceding figures in producing the outgoing laser beam and in receiving the incoming return light scattered from the code.
Figure 10:
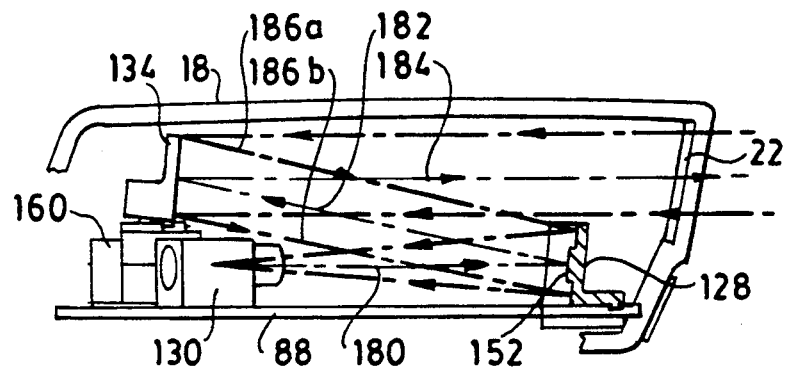
Figure 11:
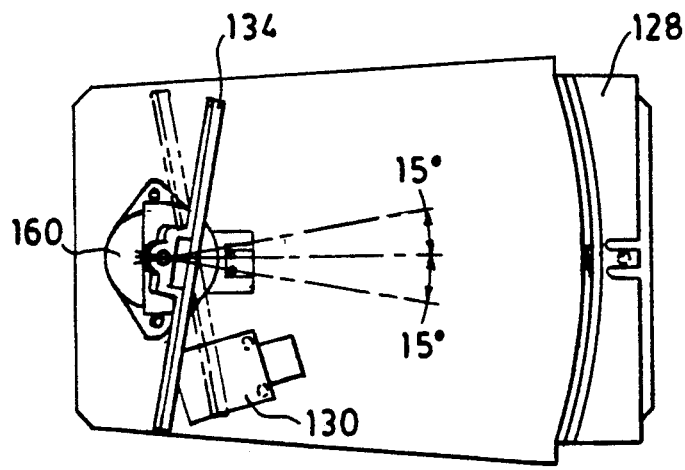

Referring next to FIGS. 9, 10 and 11, there is shown the arrangement of the optical elements which has the feature of eliminating parallax induced errors in the detected bar code signals while allowing all of the optical elements to be arranged on the single printed circuit board 92. The laser assembly 130 projects a beam along a first path 180 to the facet 152. The facet is tilted upwardly so as to project the beam along a second path 182 to the mirror 134. The mirror is tilted slightly downwardly and projects the outgoing beam along a path 184 through the window 122 towards the code to be recognized. In FIG. 10, the outgoing beam is shown by the relatively thin line made up of long and short dashes while the incoming or return light is shown by the heavier lines of long and short dashes.

The mirror 134 oscillates back and forth about the center of scan (a line between the end points of the scan). Preferably, the center of scan extends through the center of the window 22. The scan angle may, for example, be plus or minus 15 degrees about the center of scan as shown in FIG. 11. This scan angle is sufficient to scan the beam across codes within the scanning range of the unit. This range may start at the window or at a distance exterior from the window 22 depending on the anticipated location of the codes to be read. The scanning range is determined by the diffraction beam forming process as will be explained hereinafter in connection with FIGS. 7 and 7A. As the outgoing beam scans, it remains in a plane approximately parallel to the plane of the board 92. This plane may also be parallel to the plane of the top of the housing head portion 18.

The return light is scattered and fills the mirror 134. The mirror deflects the return light downwardly along a path within the lines 186A and B. It will be noted that this return path 186, when in the center of scan, is in the same plane as the path 182 of the light which is projected out of the scanner unit. The return light is then collected by the mirror 128 and focused, because of the spherical curvature of the mirror, at the photodetector 140.

Parallax is eliminated because there is symmetry between the outgoing beam and the beam of return light. This symmetrical arrangement of the beams is provided because of the use of the facet 152 in the center and along the optical axis of the collection mirror 128. As viewed with respect to the collection mirror, the distance of the outgoing beam to the code and back from the code is the same (i.e., the code is symmetrical relationship with respect to the collection mirror). The light executes the same path going out and coming in from the code. Therefore, symmetry is preserved even though the laser diode is offset from the photodetector and the beam from the diode makes an acute angle to the plane in which the paths 182 and 184 are contained. Accordingly, all of the optical elements can be placed conveniently on the printed circuit board and mounted thereon without introducing parallax caused errors which can adversely affect the uniformity of intensity of the light collected from the bar code over the scan light.

The design of the optics provides an elliptically shaped beam throughout the range in which the code can be located during scanning to derive the bar code signal. This elliptical shape is upright; the major axis of the ellipse being along the bars and spaces of the code. As compared to scanning with a beam which forms a circular spot, the elliptical beam is preferable because of the averaging effect over defects and deficiencies in the code. The aspect ratio of the ellipse is selected to provide adequate averaging of the code and relative insensitivity to scan line tilt. An aspect ratio of the ellipse can be chosen so that there is no apparent difference between an elliptical scanner or a circular scanner with respect to scan line tilt. An aspect ratio of five (5) to one (1) is suitable to accommodate a scan line tilt of 15° at the extremes of the scanner's working range.

Figure 7:
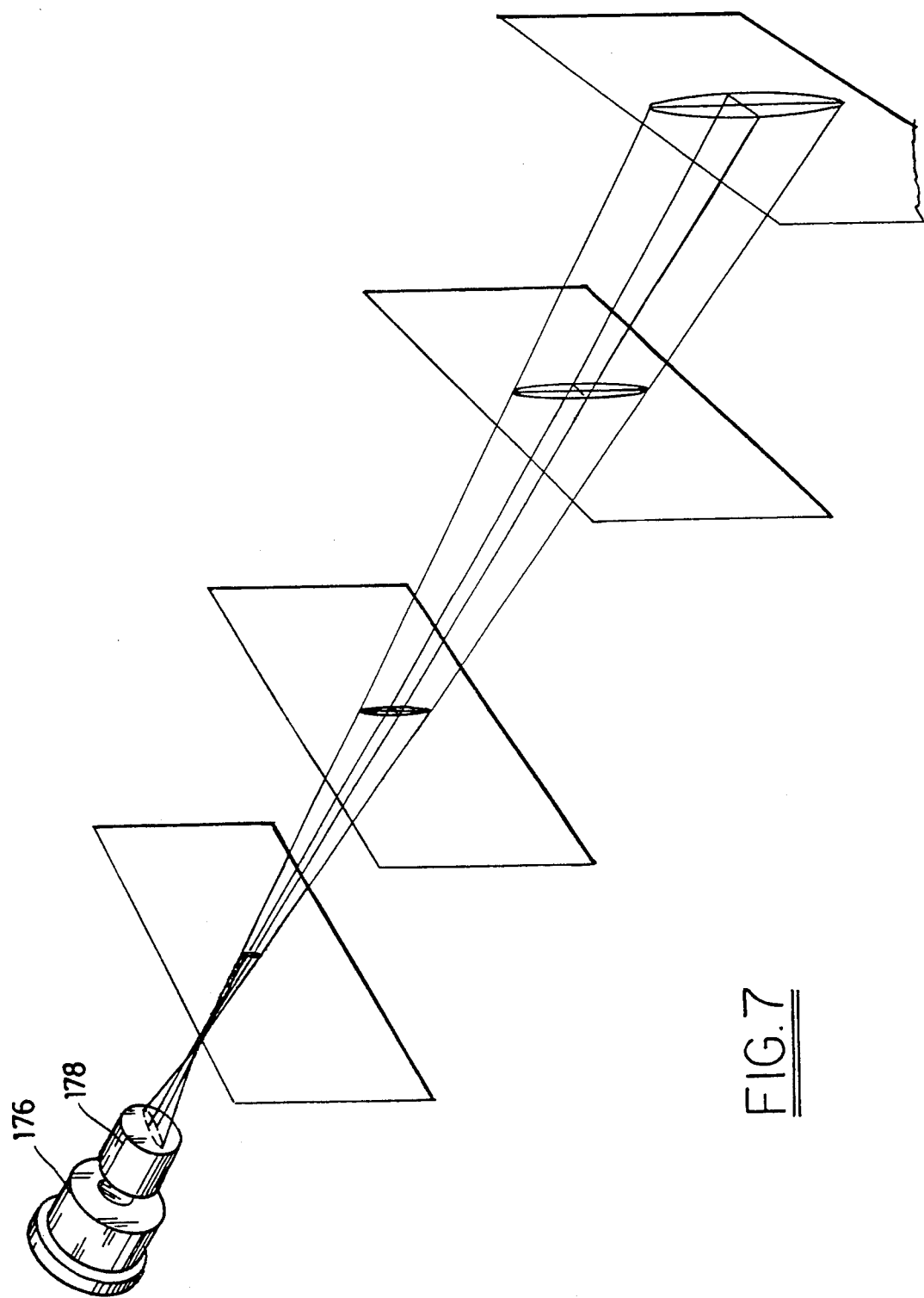
FIG. 7 is a diagrammatic view illustrating the performance of the elliptical beam shaping system of the scanner shown in the preceding figures.
Figure 7A:
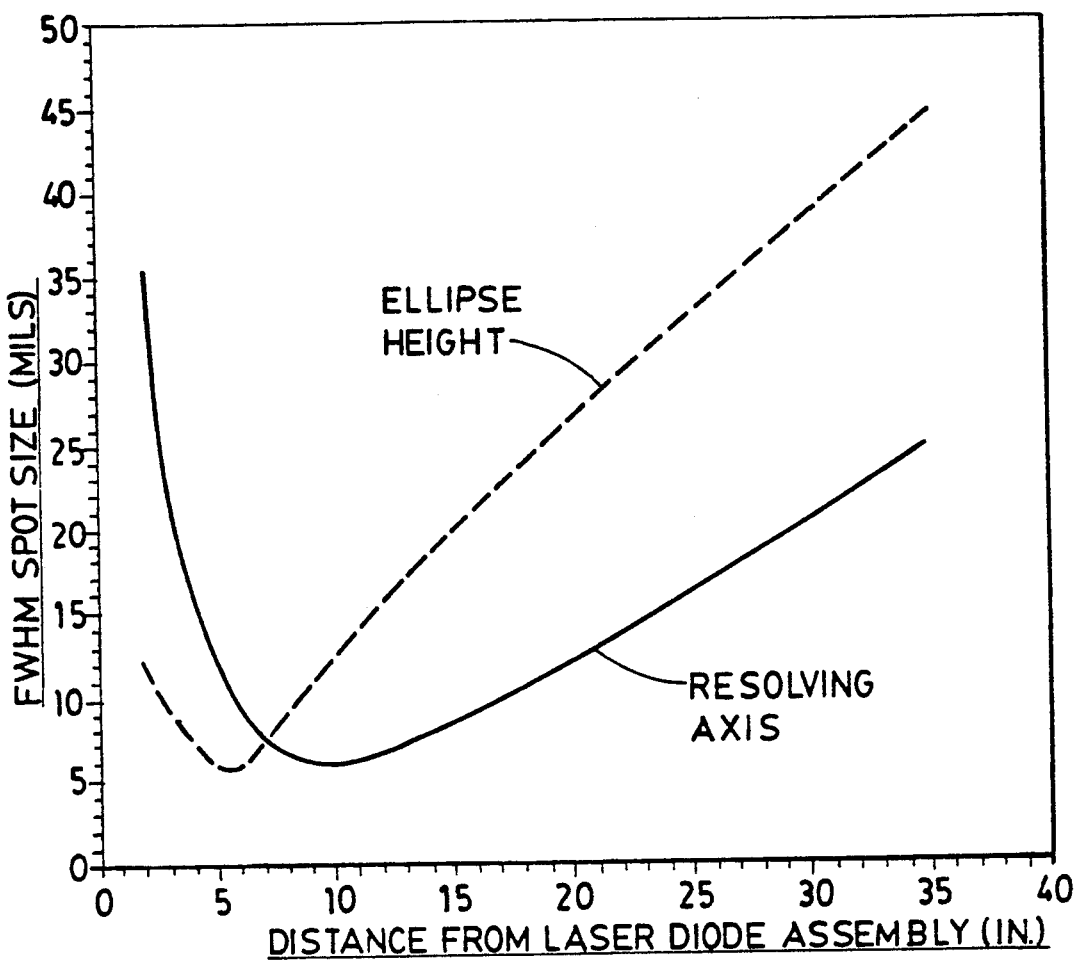
FIG. 7A is a plot showing the variation in width and length of the laser spot in the far field and illustrating that the aspect ratio (length/width) remains constant in the far field throughout the scanning range of the system.

Consider the full width, half maximum spot size of a beam transmitted through an aperture. The size is determined by diffraction effects. FIG. 7A considers the beam in two parts. One, the long part of the beam (along the major axis or the height of the ellipse). The other curve in FIG. 7A illustrates the resolving axis and considers its length which is along the minor axis of the ellipse. In both cases, near field diffraction first occurs. This is also known as Fresnel diffraction. The beam size decreases, for example, to about one-third to one-fourth of its size at the aperture (exit pupil of the light source). The minimum spot size depends upon the aperture size and occurs approximately at the Fresnel distance from the exit pupil of the source. This distance is equal to the square of the effective aperture size divided by the wavelength of the light (this is essentially monochromatic light when a laser, such as a laser diode is used). When the Fresnel distance is passed, an elliptical beam flips its orientation. This is shown in FIG. 7A by the relationship of the spot size along the ellipse height and the resolving axis of the ellipse.

The near field region terminates at the Fresnel distance. The longest Fresnel distance is defined by the length or ellipse major axis at the effective aperture. Beyond this point the region of far field diffraction (sometimes called Fraunhofer diffraction) exists. In the far field region the spot size increases. The increase is, however, approximately proportional to the reciprocal of the aperture size (1/aperture size). FIG. 7 illustrates the profile of the spot in four planes, each displaced further from the scanner, but all within the range in which far field diffraction occurs. The inversely proportional relationship of the aperture size along the resolving axis and along the ellipse height is used to advantage in order to make the aspect ratio (ellipse height/resolving axis length) constant throughout the far field range. The substantially constant aspect ratio is apparent from FIG. 7A. FIG. 7A also shows that the slope of the spot size variation with respect to distance from the source is such that the slope of the spot size variation in the far field is proportional to the reciprocal of the aperture size.

The shortest Fresnel distance (determined by the largest aperture dimension —in this case, the ellipse height) is often desirably within or near the scanner housing or inside or near the window 22 of the scanner shown in the preceding figures. In order to locate the far field diffraction range starting a few inches away from the window 22 and also to provide a phantom aperture which will maintain the aspect ratio of the elliptical beam in this scanning (far field diffraction) range using the diverging beam from a visible laser diode, it is desirable to use a very short focal length lens. The effective Fresnel distance $D_{eff}$ with a lens is reduced as a function of the focal length of the lens in accordance with the following relationship:

$$1/D_{eff} = 1/D - 1/f$$

Where D is the Fresnel distance as determined by the aperture size and the wavelength of the light and f is the focal length of the lens. A gradient index lens 180 is preferably used as a short focal length (for example 2.5 mm focal length lens). The effective aperture is formed where the lens begins to focus the diverging wavefront from the laser 176. This is called the principal plane of the lens and is effectively the exit pupil of the source where a phantom aperture exists. Locating the lens principal plane with respect to the laser 176 also determines the phantom aperture plane location and, the size of the ellipse and the resolving or minor axis of the ellipse. As shown in FIG. 7, the ellipse height at the principal plane (the phantom aperture) is desirably disposed transverse to the code so as to take advantage of the flip in the profile which occurs after the longest Fresnel distance. Accordingly, the beam forming diffractive optics uses far field diffraction.

Referring next to FIG. 14, there is shown the electronic circuitry of the bar code scanner/reader 208. All of this circuitry may be located on the printed circuit board contained in the head of the unit. The printed circuit board also mounts the collection mirror and the deflector (scanning mirror) and its motor. The feature of the electronic system shown in FIG. 14 is that it is totally digitally controlled. Some of the principal parts of the circuitry are: (a) the front end or bar code reading circuits 140; (b) the laser regulating and drive circuits 144 which control current to and drive the laser diode LD and photo diode PD assembly 142; (c) motor drive circuits 146 which operate the motor 148 which is a stepper motor having phase A and B stator drive coils; and (d) interface circuits 150a and 150b which output the bar code signal and receive command signals and data from the host computer. There are also indicator (display) circuits 152 which include LEDs.

Digital control is provided by a computer system 154 having a microprocessor 156. An analog to digital converter (ADC) 158 and a nonvolatile memory (NVM)

which may be an electrically erasable programmable read only memory (EEPROM) 160 are associated with the microprocessor 156. The microprocessor may be a commercially available chip such as the Motorola MC68HC705C8 chip. This chip has a multiplicity of ports DP0 to DP21 which may be used to receive data and commands and to output data and commands. The microprocessor may be programmed from the host computer with data which arrives on the ACK line through the interface logic 162.

In this way the AutoStand functions are programmed, thereby implementing the programmer 210 (FIG. 23). Under programmed control, an output command SDPOL is provided by the state of the SDPOL line from DP3 to make the scanner compatible with the polarity and level of the data from the host computer. Universal compatibility with various types of hosts is, therefore, provided. This data is outputted on the serial data input (SDIN) line to DP2 of the microprocessor 156 and thence delivered on the data input line (DI) from port DP1 to the memory 160 where the program is stored. The memory is enabled to receive programming data by clock signals from the computer chip 156, when an enabling line CS1 of 4 enabling lines which selectively enable the various peripherals (the ADC 158, the NVM 160 and the digital control elements in the front end 140 and in the regulator 144). In this way, the various peripherals can be multiplexed for input and output of data to the microprocessor 156.

The scanner is enabled either by the trigger switch (TRIG-SW) in the scanner or from the host in response to an enable command. The application of power may also enable the scanner. Thus, the scanner can be enabled three ways either with the trigger switch, the enable input, or by application of power. The scanner could be enabled by any scanner input by suitable modification of the program. The interface 150a has logic 164 which handles these enable signals and ORs them to generate a WAKE signal which operates the power control 165 as by setting a flip-flop (F/F) which then turns on a voltage regulator circuit 166. The circuit 166 has a regulator chip of conventional design which regulates the output supply voltage from the computer, power supply, portable terminal or battery in the handle of the scanner and provides a regulated voltage indicated at +V, which may be 5 volts. The power stays on until a SLEEP command from port DP9 of the microprocessor 156 is generated, either on code detection or after a time-out, as may be programmed by the programming data in the memory 160. This operation conserves battery power to increase battery life.

The programming data is stored in the memory 160 under control of the microprocessor 156. It may be desirable to read the programming data. Then, that data is made available on the SD out line from the port DP4 of the processor 156. The output data (serial data output) is multiplexed under program control in the microprocessor 156 and supplied to an output line (BCV, bar code video, or PROG.DATA) from the interface logic 150b. The polarity of the output data, whether BCV or program data is controlled by the BCPOL line to be compatible with the host computer.

The host computer 210 operates to decode the BCV signal. The BCV signal is obtained from the front end 140 and represents the bar code message by the analog timing of the pulses thereof. The host 210 may use conventional decode logic to obtain the bar code message which is received, thereby implementing the decoder 226 (FIG. 23). Another output from the interface logic 150b is the start of scan (SOS) signal which indicates when the beam is at the starting ends of its scan, either on the right hand or the left or both. The program in the microprocessor which controls the scanning motor 158 to oscillate the mirror provides the SOS output which is a level which changes state at the end of scan. This is to be distinguished from the BCV or program data level which is controlled by BCPOL depending upon the requirements of the host. The bar code video may be black high or white high. The scanner generates BCV as white high in this embodiment of the invention, which can be converted to black high in order to meet the requirements of the decoder in the system computer with which this scanner and other scanners in the system work.

The front end 140 has a photo diode circuit 168 which develops a current signal depending upon the intensity of the return light. This signal is converted into a voltage signal by a transimpedence (TRANS-Z) amplifier 170. The voltage signal is then differentiated in a differentiating circuit 172 to follow the transitions in the signal which correspond to the locations of the edges of the bars and spaces. A digital control element 174 in the form of a digital potentiometer provides forward gain control to the first amplifier in a chain of amplifiers 176. The gain control is automatic and the digital pot 174 is set by the digital input (DI) which is stored in a register in the digital pot 174 when it is enabled by the enabling signal CS2. The digital pot 174 may be $\frac{1}{2}$ of a dual pot circuit element containing another digital pot 178 which is used as the digital control element in the laser regulator circuit 144 and will be described hereinafter. The DI signal may be, for example, 16 bits stored in a common register of the dual pot 174 and 178, the pots using the first and last 8 bits in the register (DP1 and DP2).

The gain of the front end is set under computer control. Since the scanner scans in opposite directions and the velocity of scan or intensity of the return light may be different in each direction of scan, the digital pot 174 is set to follow the intensity of the return light not on the immediately preceding scan but the scan which occurred before the immediately preceding scan or on alternate scans. The program then changes the gain on alternate scans so that the amplifier output signal amplitude stays constant from scan to scan. In addition the relationship between the intensity of the return light and the gain may be in any desired functional relationship, whether linear or non-linear, under program control which sets up the relationship between the value of DI and the signal corresponding to the intensity of the light.

It is desirable to turn off the front end so that spurious illumination does not generate signals which may be confused with actual bar code video output or program data. To this end the microprocessor generates a not-kill bar code ($\overline{KBC}$) which enables the amplifiers to transmit output signals only during actual scanning operations. The signal which controls the gain, and therefore the sensitivity of translation in accordance with the intensity of the return light is a peak detector circuit 180 which follows the peaks of the gain controlled differentiated voltage representing the bar code. The output of the circuit 180 is a voltage level DPD. This level is digitized in the ADC 158. The ADC has a plurality of channels one of which (CH1) receives DPD. Analog to digital conversion is enabled when the chip select CS0 is high and also when a code (DI) from the microprocessor identifying the channel to be digitized exists.

The voltage representing the bar code is translated into analog pulses (the BCV) by a discriminator circuit 182 including a comparator 184 which compares the differentiated signal with a peak voltage on a capacitor 186 charged through oppositely polarized diodes 188. The design of the discriminator 182 is the subject matter of U.S. Pat. application Ser. No. 518,608, filed May 3, 1990 in the name of Jay M. Eastman and assigned to the same assignee as this application. The discriminator outputs BCV which is applied to a port DP7 of the microprocessor 156 and also may be applied to the host computer via the interface logic 150b. This port DP7 is an input capture port which detects rising edges. The circuitry of the capture port is logic which is part of the commercially available chip. Falling edge detection may be used instead of rising edge detection, if desired, i.e., the edge which is used is of no consequence.

The laser regulator circuit includes a control loop having a comparator 190 which outputs an error signal to a driver amplifier 192 thereby controlling the current through the laser diode LD. This current is available at ILS and is applied to CH0 of the ADC 158 for digitization during laser output power regulation and also during initialization of the laser to set its power output. The control loop includes a photo diode PD which is optically coupled to the laser diode and provides an output current across a resistor 194, representing the laser optical output power, which is compared with a reference input to the comparator 190 to derive the error, control signal for controlling the laser current. This reference signal is obtained from the digital pot 178 which receives a regulated reference voltage at one end thereof. In order to prevent the laser from being turned on except during a scan, a transistor switch 196 drives the reference input to the comparator 190 to ground thereby cutting off current to the laser diode.

The optical power is calibrated to a desired power which is represented by digital signals in the memory 160 by setting the digital pot 178. During calibration, in manufacture of the scanner, an ILS value corresponding to the desired optical power as measured by an exterior power meter is obtained and the corresponding ILS value stored as a parameter in the memory 160 or elsewhere in the microprocessor 156. Then the digital pot resistance is changed to increase the reference voltage applied to the comparator 190. During normal scanning, if ILS exceeds predetermined current value (e.g., 37% above nominal operating current as might be the case if the laser is operated at a temperature over its recommended maximum operating temperature), the laser is turned off. Then, operating the trigger switch or receiving an enable from the host computer will not cause the laser to be powered up at an excessive current which might destroy the laser.

During normal laser regulating operation, the value of the reference voltage as obtained across the digital pot 178 stays constant and the control loop regulates the laser current in order to maintain ILS at a desired value for prescribed laser optical power output.

During factory calibration, the digital pot 178 setting is determined upon command of the external computer and optical power meter, whose analog output is attached to the ADC's 158 PWCAL input through a buffer amplifier 159. The calibration procedure is controlled by the scanner's microprocessor in the following manner. The digital pot setting is steadily increased from minimum to maximum power while both the laser current (ILS) and measured optical power PWCAL are monitored. When the measured power agrees with the requested power (sent by the external computer as part of the command), the scanner's microprocessor saves the digital pot setting and laser current readings in NVM 160. If, during calibration, several different pot settings are tried without a difference in measured power being noted or excessive changes in measured laser current are noted, the calibration mode is cancelled (to protect the scanner's circuitry) and a "calibration failed message" is sent to the external computer. The laser power and the intensity of the beam emanating from the laser is controlled by changing the value of the digital signal applied to the pot 178. This is done at the outset of the pulsing mode in the LPULSE routine as will be described in connection with FIG. 25.

The motor windings are driven by current pulses, the direction of which in each coil is controlled by push-pull amplifiers (PPAMPL) 198 and 200 for coil A and 202 and 204 for coil B. These pulses are controlled in duration by the duration of the motor control levels SDAA1 through SDBA2 from the microprocessor 156. In other words, pulse width modulation is used to produce waveforms on the coils A and B to control the motor to provide generally linear scan velocity. Moreover, the maximum pulse width determines the length of the scan. In prior motor controls systems, bias current was applied to one winding, while the current to the other winding was changed linearly. Such linear change does not produce a linear velocity during the scan. By pulse width modulation control (microstepping), the requisite non-linear variation in current to the coils during the scan can be obtained to obtain a generally linear sweep velocity over the scan. By controlling the direction of the current, the motor and the oscillating mirror can be centered so that the center of scan is approximately at the center of the window thereby avoiding the need for mechanical centering.

The scan length (scan angle) is controlled by controlling the amplitude of the average current in each coil during the scan. The higher the average current through the coil the larger the excursion. Thus by increasing the duty cycle over the scan, the scan angle increases.

Control of scan length is obtained using the microprocessor 156 and an analog triggering mechanism represented as a resistor 206 having a resistance which is inversely proportional to the force or pressure applied by the trigger thereon. This resistor may be a pad of polymer material which is commercially available and called a force sensing resistor (effectively a strain gauge). Such pads are obtainable from Interlink Electronics of Santa Barbara, Calif. 93103. The voltage across the variable resistor pad 206 is presented to channel 2 of the ADC 158. Under program control, the microprocessor in response to the digital input (DO to DP0), the average current is changed in response to the pressure applied by the operator against the trigger and thence to the resistive pad. At the beginning of a scanning operation, very little force can be applied thereby providing a very narrow scan suitable for aiming the beam at a particular code, which may be one of a multiplicity of closely spaced codes on the side of a package or a sheet of paper. The spot where the beam is incident is bright because the beam is not spread out thereby facilitating aiming. Once the code is located, the pressure can be increased and the scan length (scan angle)

increased in accordance with the microprocessor's program which varies the timing of the output levels SDAA1 through SDBA2 on DP10 through DP17.

The microprocessor also provides outputs SLED and GRLED which may be low during scanning and following the successful reading of a bar code symbol and when the power control is on (between the times of occurrence of the wake and sleep commands). Then the SLED or the GRLED 152 will be lit.

It has been found that a simplified motor control circuit such as shown in FIG. 14A may be used in which only two commands SDAA1 and SDBA1 are needed. Then current flows through the motor coils A and B only in one direction. It has been found that by modulating the duty cycle of the SDAA1 and SDBA1 pulses which are applied through RC damping circuits, the scan velocity and length may be controlled. The scan oscillation or repetition rate is also controlled by the periods during which the motor control pulses execute a cycle (i.e., the maximum duty cycle or period of the pulses). The programming of the microprocessor 156 to obtain the digital control functions discussed above, will become more apparent from FIGS. 15 through 19.

The overall program is called Power On Start (FIG. 15). The CPU is first initialized. New data is loaded into the microprocessor internal memory from the external non-volatile memory (NVM). This is done every time a wake signal occurs; the wake signal acting as an interrupt to go to the initialize process.

The next process is the calibration of the AGC which determines the amplifier's bias voltage by averaging many samples of DPD under no signal conditions (laser off and motor stationary). This process compensates for scanner-to-scanner component tolerance variations.

The CAL AGC routine is shown in FIG. 16. The digital pot in the front end is reset to its maximum resistance. Then, 256 samples of DPD are read via the ADC. The reading is accomplished at the maximum clock rate of the ADC.

The 256 samples of DPD are averaged. The average is named CAL. This average is used in computing the digital control signal to the digital pot 174 to set the amplifier gain during scanning operations. The program is described hereinafter in connection with FIG. 17.

Returning to FIG. 15, the program next sets the time delay for the generation of a sleep command after occurrence of a wake command. Then, all of the interface functions including the AutoStand processes, are set up utilizing the program data from the host 210. At this time, if the host computer 210 desires, the program can be checked by reading out the stored program back into the host. Levels corresponding to data states (polarity) and formats are now set up in the system and the system is now capable of receiving new commands. The decision is whether a command arrived on the ACK, EN (enable) or TRIG (trigger) or any combination thereof. If so, the system jumps to the routine called motor (MTR) which generates the pulses for operating the scan motor to scan the beam. During the scan routine, the laser power is regulated as will become more apparent from FIG. 18. When AutoStand is programmed, the TSTAS processes are entered and the SCNINH flag is cleared each time the overall Power On Start program is executed.

The system then waits for a decision as to whether either a sleep command was generated or if external serial data from the host computer contained another command. This other command may be a new program, a command to calibrate the laser diode so as to set a safe level of optical output power as required by governmental regulations or the like. A sleep command can also be generated by external data, for example, that a bar code has been decoded. After the sleep command occurs, the power to the laser diode is shut off and the system stays idle until the next wake command.

FIG. 17 illustrates the AGC routine. First, the CH1 of the ADC is enabled to read the DPD level. Next, during scanning, the CPU reads DPD via the ADC approximately 100 times and stores the 16 largest readings at the frame's end. The average of these 16 values is used as DPD in the equation shown in FIG. 17. Gain codes (digital control signals) corresponding to G' are generated on each scan. Gain codes are used to control the gain for scans in the same direction as the scans on which they are derived.

Therefore, two values of G' for alternate scans are stored. These are shown as LG' and RG' for scans to the left and to the right, respectively. The program controls the microprocessor to apply these alternate values to the DI data line to enable the digital pot 178 to control the gain in accordance with LG' and RG' values on alternate scans.

Referring to FIG. 18, there is shown the MTR routine during which the beam is scanned across the code. The routine starts by initializing values. The scan LED (SLED) is set high so that that LED is lit. The bar code polarity (BCPOL) is set so that the host computer and its decoder will receive bar code white high or black high levels corresponding to the bars and spaces of the code as required by the decoding format. Next, not kill bar code ($\overline{KBC}$) is cleared, thereby allowing the amplifier chain 176 (see FIG. 14) to pass the differentiated bar code signal to the discriminator 182. The digital pots are set to their calibrated values both in the regulator (DIGPOT 178) and the AGC control in the front end 140 (DIGPOT 174). In order to initialize the routine which generates the scan motor drive pulses, a code representing the off period (OFFPER) for each scan current pulse cycle is then set to 0 value. When Autostand is programmed the scanning flag is set and SCNINH is cleared.

In order to understand the meaning of OFFPER and, in general, how the scan motor drive pulses are generated, consider FIGS. 20 and 21. These figures show the pulse width table and the SD (port) signal values. The tables are stored in memory (in the NVM160—FIG. 14). The pulse width table stores N pulse width values, 16 of which represent the motor coil current durations during a scan in one direction (e.g., to the left) and the remaining 16 (total 32) represent the durations of the current pulses for the scans in the opposite direction (to the right). In effect, the table represent the waveforms of the motor drive current during each scan in terms of corresponding pulse width modulated signals. It will be appreciated that a single pulse does not produce an entire scan but a series of pulses (in this case, 16 for each scan direction—8 for each phase) of different duty cycle define the waveform which controls" the motor to execute a scan. The maximum duty cycle may for example, correspond to 16 clock pulse periods; the periods occurring at a rate of 240 per second (divided down from the microprocessor clock; e g , a 7.3728 MH$_z$ clock). The maximum period of the current pulse corresponding to 50% duty cycle is then 16 clock pulse periods. This maximum period is denoted by the symbol A in the flow chart for the scanning routine shown in FIG. 19. The off period is the difference i.e., the maximum duty cycle period A minus the period of the pulse, $t_i$. In the pulse width table, the $t_i$ pulses have values from 0 to 15 which is the number of clock pulse periods per maximum duty cycle. It will be noted that the entire duty cycle is preferably not used. Thus, the pulse width table may store 32 (N=32) values which vary from 0 to 15 in numerical value.

The SD (port) signal values in the table shown in FIG. 21 represent the polarity of the current (the current direction) through the A and B coils of the scan motor corresponding to each successive $t_i$ value in the pulse width table. Thus, there are 16 index or I values for each scan, I=1; I=2; I=3 ... I=N. These index values correspond to the pulse width table values, $t_i=1$; $t_1=2$; $t_i=3$; ... $t_i=(N+1)$. N=32 in this embodiment covering a left followed by a right scan. There are therefore corresponding port signal values for each pulse width value. The port signal values are those that exist during the time that the pulse is on and not during the off period. During the off period the signal values at the ports are all 0 so that no current flows through the motor coils. The current to the phase A coils are controlled by four bits; SDAA1, SDAA2, SDBB1 and SDBB2 as shown in FIG. 14, since these coils are connected through push-pull amplifiers. Similarly, the phase B coils are determined by the levels of the ports SDAB1, SDAB2, SDBA1 and SDBA2. Different ones of these ports are high or low or off so as to drive the A coils with current in one direction (A+, or in the opposite direction, A−). Similarly, the phase B ports are either high or low to provide phase B current in opposite directions. In this embodiment only one coil (A or B) receives a pulse during any one of the 16 cycles where a drive pulse can be passed through a motor coil. This conserves battery power. Accordingly, by controlling the port signal values, currents corresponding to the pulse width values in the pulse width table are generated so as to drive the scan motor to oscillate back and forth with a different oscillation (scan) length corresponding to pulse widths, because the average current through the coil during each scan depends on the pulse width. For full pulse widths the durations of the pulses may be the maximum duty cycle or 15 clock pulse periods during each period in which a pulse can be generated (the A periods). The length of the A periods determines the number of scans per second. For 30 scans per second the clock pulses which make up the A periods run at 240 periods per second rate. The rate is increased for a faster scan rate and decreased for a slower scan rate. 30 scans per second is presently the preferred scan rate. The relationship between pulse rate and scan rate can be expressed mathematically as follows:

$$\text{Pulse Rate/Phase} = \frac{1}{\frac{\text{SCANS}}{\text{SEC}} \cdot \frac{M}{2}}$$

where, M = Waveform samples/Phase.

In the event that the simplified motor drive circuit of FIG. 14A is used. The motor currents are either in one direction or off. Then, only two SD port signals are used. It will be noted that the last process in the routine of FIG. 18 is to pulse the SD ports to center the motor to the COS (center of scan). This is a desirable but not essential process in that the pulse widths and current directions in the motor coils may be adjusted so as to cause the beam to be centered approximately in the center of scan (which falls midway across the width of the window 22 in the scanner). The table values are obtained experimentally on an interactive basis with the host computer so as to obtain a generally constant velocity over the scan and in the plane of the code being scanned as may be observed by the intensity of the spot as it scans across a plane where the code may be located. To obtain different scan angles, a plurality of pulse width tables may be stored and the table corresponding to the desired scan angle selected.

Returning to FIG. 18, after initialization the laser diode is turned on. A command $\overline{\text{LDEN}}$ is set low, thereby disconnecting the transistor switch 196 from ground and allowing the laser to operate at the level set by the value of the digital signal which controls the digital pot 178 in the laser regulator 144.

Next, the table index is set at 0. A timer is then set to generate the first interrupt which allows entry into the scan routine shown in FIG. 19. This scan routine occurs asynchronously in the program. During the routine there are successive interrupts generated which cause the index to step and thereby output different pulse width table values and cause different corresponding SD port signal values to be generated at the SD ports of the microprocessor 156.

The next step in the routine is to determine if the laser current has exceeded its safe limits. This is done in the microprocessor 156 in response to the laser current value which is digitized in the ADC 158. In the event that the current limit is exceeded, destructive failure of the laser diode could occur. Then, the LDEN command is set high, thereby shutting off the laser diode. As part of this safety aspect of the motor routine, the computer flashes the SLED and GRLED commands on and off so that the operator can realize that the laser has overheated. The operator can then wait until the laser cools down before reattempting to start the system. For example, by pulling the trigger.

If a stop scanning command has been received, the laser diode and the scan LED are cut off. Also, the SCANNING flag which is set at the beginning of the SCAN BEAM routine is cleared. After the laser diode and scan LED are shut off, the SCNINH flag is set. The counter which generates the interrupts in the scan motor drive routine shown in FIG. 19 is then inhibited so that the motor can no longer scan. Then, the operation noted above as being optional to center the motor electronically to the center of scan by pulsing the SD ports is carried out. The motor stops at the center of scan. If desired, the motor can be stopped at the center or at either end of the scan by detecting the table (FIG. 20) index value for the desired stop location and interrupting the motor drive current when that index value is detected. Starting scanning at an end of scan (with the mirror off center of scan), can minimize the time required to read a code, since the first scan is then a complete full length scan.

Consider next the routine shown in FIG. 19 where the scan motor pulses are generated. Generally, the routine has two states which occur respectively while the pulses $t_1, t_2 \ldots t_N$ are being generated and while these pulses are off (during $A - t_1, A - t_2, A - t_N$). The value in the first state is $t_i$ and the value in the second state is the off period (OFFPER). As noted above, during initialization, OFFPER is set to 0. The first time through the routine, upon occurrence of the first interrupt OFFPER is 0. In one branch of the routine the SD port signals are fetched from the SD table at the index value I=0, which was set in the second process step in the routine after initialization (see FIG. 18). Next, the off period is computed as the maximum duty cycle A minus the pulse width table value for the I index. The index is 0 on the first pass through the routine.

Next, a timer is set at the pulse width from the pulse width table for the index and an interrupt occurs on time-out. When this next interrupt occurs, the decision as to whether off period equals 0 is negative and the program proceeds to the other state. This is the off period time after the first current pulse. Accordingly, current to the motor windings is cut off. This is accomplished by setting SD port signal values for current cut off and no current flows to the coils (phases A and B) of the motor.

Next, a timer is set to the off period value which was computed during the first part of the routine. An interrupt then occurs on time-out. The next interrupt causes the routine to enter its first state so that the next pulses which drive the motor during the scan are generated. The index is also advanced by computing the index value by the modulo N addition shown in the flow chart of FIG. 19. The program proceeds to generate the next current pulse value. By then, in the other state of the routine the memory containing OFFPER is cleared. Accordingly, when the next interrupt occurs upon time-out of the timer which has been set to OFFPER, the routine proceeds along its first branch. It will therefore be seen that the routine switches from state to state (branch to branch) until a complete scan cycle (scan to the left and scan to the right) is executed.

The index number also represents the start of scan on the left and right scan. For example, index number equal to 1 starts the right scan and index number equal to 17 starts the left scan. The start of scan (SOSPORT) is then inverted to set the scan flag to indicate start of scan. This start of scan signal is used in the decoding process and is detected by the host computer via the interface logic 150b. The laser can be interrupted at these start of scan locations, in response to the table index values (see FIG. 20). The laser is then off where the beam velocity is minimal. This conserves electrical power, and reduces laser light output for safety considerations under computer control rather than by optical detection of the mirror position (see U.S. Pat. No. 4,820,911 of Apr. 11, 1989). Before the SOS flag is checked, the TSTEOS routine FIG. 27 is entered. This occurs only if AutoStand is programmed. TSTEOS checks for premature (before decoding) removal of the bar code label. It is entered whenever scanning is going on. See also FIG. 26.

Returning to FIG. 18, it will be noted that the AGC digital pot setting adjustment is made when the SOS flag is on and continues to be made during each scan until the stop scanning command is received. The command may come from the host computer or may be the sleep signal generated upon time-out in the microprocessor. TSTAS is also checked before scanning is stopped when AutoStand is programmed. This enables a new search for the next object and the reading of the bar code label thereon without waiting for the next power on start program (FIG. 15) cycle.

The following discussion of AutoStand operation begins with a system overview followed by the details of the individual subroutines which implement the program controlling AutoStand operation scanner.

As mentioned in connection with FIG. 23, the scanner, upon power application, recognizes it is to operate in AutoStand mode based on configuration data loaded from the NVRAM and begins emitting low-power (e.g., 67 microwatt) light pulses (of, e.g., 5% duty-cycle). The emission of the pulses is controlled by periodic timer interrupts generated by the microprocesor's internal timer circuitry. These emitted light pulses are either reflected back to the scanner via the reflecting tape on the base of the AutotStand if no object is present, or, not reflected if an object blocks the light beam emanating from the scanner. Note that the optical power of the laser during the pulsing (object detection) mode is fairly critical, as too much power will cause pulses to reflect (or refract) from the object being detected, and too little power will not allow the scanner to detect the pulses reflected from the AutoStand base.

The microprocessor s internal timer circuitry which is connected to the bar code digitizer (BCV, FIG. 14), counts the number of like edges received over a given period of time and makes a decision as to whether or not an object is present by comparing one-half the number of generated light pulses with the number of received BCV pulses. The factor of two margin in the comparison of emitted pulses and received pulses gives the system a good deal of immunity against falsely detecting targets due to random noise within the scanner's circuitry.

When the number of emitted pulses exceeds two times the number of received pulses, an object is detected, the pulsing mode is discontinued and the scanner asserts its TRGOUT output. An external decoder (FIG. 22, 210), upon detection of the scanner's trigger signal, activates scanning mode, usually by asserting enable. The scanner, upon detection of enable, discontinues pulsing mode and begins scanning. Scanning continues until one of two conditions occur; a good decode is performed (the decoder deasserts enable) or the target is removed from the scanning area. Removal of the target is detected by the scanner in one of two ways: the number of BCV edges during 50 consecutive scans is fewer than the minimum number required for any bar code symbology (the minimum required number of bars is 18), or, the scanner's amplifier gain is adjusted (by the AGC operation) to minimum gain (a large value) for the same 50 consecutive scans. If the absense of a target is detected, the scanner deactivates its TRGOUT signal, which in turn causes the external decoder to deassert enable, thus terminating scanning mode. Upon termination of scanning, the scanner reactivates pulsing mode, to detect the removal of the bar code target. Once target removal is detected (PULSES/2<=BARS), the scanner begins searching for the next target to be scanned.

The subroutines shown in FIGS. 24 through 28 are the implementation of the above description in the 5300 scanner. START PULSE in conjunction with LPULSE control generation of light (laser) pulses to detect the presence or absence of possible bar code targets. ICAP detects the presence of reflected light pulses. Finally, the TSTAS subroutine acts as the state sequencer, controlling the scanner's operating state: scanning (reading bar code) or pulsing (object detection). A detailed description of these routines follows.

Light pulse generation is accomplished by alternately setting the digital pot (178) controlling the laser to the value required to produce 67 microwatts of light output (this value is determined during factory calibration) and zero (which shuts off the laser). The microprocessor's internal timer circuitry, in conjunction with LPULSE, controls the pulse width and frequency (and therefore duty cycle). To begin pulse mode operation the scanner's idle loop routine (FIG. 15), invokes TSTAS (FIG. 27), which detects that pulsing and scanning are inactive and activates pulsing mode by invoking START PULSE. START PULSE clears LSTATE, activates the pulsing flag (indicating the pulse mode is active) and programs the microprocessor's internal timer to generate an interrupt in 50 milliseconds. After 50 milliseconds has elapsed, an interrupt is generated, to which the CPU responds by invoking the LPULSE routine. The LPULSE routine examines the even- or oddness of LSTATE and alternately turns the laser on or off. Additionally, the timer is reprogrammed for either 2 milliseconds (if the laser is turned on) or 38 milliseconds (if the laser is turned off). If the laser is turned off, PULSES is incremented and the STOPP flag is examined to see if the pulse mode is to terminate. If pulsing is to terminate, the pulsing flag is cleared, otherwise, the timer is programmed for 38 milliseconds (the laser off time). Before exiting LSTATE is incremented so that subsequent interrupts will switch the laser to its alternate state (from on to off or vice versa). When PULSES is incremented, the CPU checks to see that no overflow occurs (maximum value 255). If PULSES does overflow (its new value is zero) and BARS is cleared. This is done to maintain synchronization between PULSES and BARS.

ICAP (FIG. 26), is asynchronously invoked in response to the microprocessor's input capture hardware. The CPU's hardware generates an interrupt in response to an edge (the polarity is software selectable) on the BCV signal. The CPU responds by invoking the ICAP routine. ICAP counts the received pulse by incrementing BARS. If BARS overflows (its new value is zero) and PULSES is cleared, again, to maintain synchronization between BARS and PULSES.

FIG. 27 shows the TSTAS routine which controls the scanner's state (pulsing or scanning) and detects premature object removal (in conjunction with the ICAP and the AGC ROUTINE (FIG. 17)). TSTAS is invoked from the scanner's idle loop (IDLE in FIG. 15) and during scanning (FIG. 18). When invoked, TSTAS determines the scanner's current operating mode (scanning or pulsing or neither) by examining the scanning and pulsing flags. If it is determined that neither operation is in progress, TSTAS will initiate the pulsing mode by setting the amplifier gain to a fixed value and BCV is enabled by clearing $\overline{KBC}$, invoking the START PULSE routine (see above), and setting the pulse mode flag (to identify that the pulsing mode is active).

Having initiated pulsing mode, the variables BARS and PULSES are now monitored on subsequent calls to TSTAS. When PULSES is greater than or equal to 10 and PULSES/2 is less than BARS, an object is present. Assuming this is the "first" object (after power is applied), NEWLBL and SCHINH will both be zero. In response, TSTAS routine will deactivate the pulsing mode by setting STOPP (which causes LPULSE to terminate the pulsing mode). FRCOUNT is cleared, NEWLBL is set and TRGOUT is activated.

The external decoder (226-FIG. 23), in response to TRIG activation, asserts ENABLE (150a of FIG. 14). Enable is detected by the scanner's idle loop and invokes the motor scan routine (FIG. 18) which initiates the scanning mode. During scanning, calls to TSTAS route program control to TSTEOS (since the pulsing flag is clear and scanning flag is set). TSTEOS tests for the object (which initiated scanning) to be removed. This is accomplished by examining BARS and the AGC computed gain values once, at the end of each scan (left-to-right and right-to-left). If a scan continues fewer than 9 bar edges, BARS will be a value less-than 9 and FRCOUNT is incremented. Otherwise, if the calculated amplifier gain values (LG and RG, FIG. 17) are above 239 (indicating a very large received signal), FRCOUNT is also incremented. If it is found that to the gain values are below 240 and there are more than 9 bar edges during the scan, there is a target in the scanning zone and scanning is continued by clearing FRCOUNT. From this description, and FIG. 28, it should be apparent the FRCOUNT contains the number of consecutive frames (scans) during which there was no object detected. If FRCOUNT exceeds 50, TSTEOS decides there is no bar code target in the scanning region and deactivates the scanning operation by deasserting TRGOUT.

The external decoder, upon sensing the removal of TRIG (which is derived from TRGOUT), will deassert enable. This in turn causes the scanning routine (FIG. 18) to detect a stop scanning command and discontinue the scanning mode. In the process of discontinuing scanning, SCNIHN is set. As an alternative to detecting a missing target, as just described, the external host (the decoder) can command the scanner to stop scanning after a successful decode also by deasserting enable. Other than the state of TRGOUT, these two cases are identical. Once scanning is terminated, both the pulsing and scanning flags will be clear (as they were at the beginning of the program). As a result, the next invocation of TSTAS will cause the pulsing mode to resume.

The second initiation of the pulsing mode differs from the first because NEWLBL is true (nonzero). NEWLBL, was set when a label was detected, and as a result directs TSTAS to wait for a no target present condition, which is indicated by PULSES greater than 10 and PULSES /2 less than BARS. Upon detection of this condition, NEWLBL is cleared, and also PULSES and BARS are cleared. NEWLBL, when cleared reenables the search for subsequent labels.

SCNIHN, is used to prevent rescanning after a successful decode, and is used for normal scanning as well as AutoStand. SCHINH is set upon exit from the scanning routine (FIG. 18) and cleared by the idle loop (FIG. 15), when the start scanning condition is determined to be false from TSTSOS. When SCNINH is true, activation of the scan mode (either from AutoStand or in normal scanning) is disabled. For the usual decoder interface (trigger and enable), SCINH has no affect, however for other decoder interfaces (as when the acknowledge signal is supposed to stop scanning) SCNINH has utility.

One of the features of the scanning system described herein is its ability to interface with a wide variety of existing decoder interfaces (see the above referenced patent application). This is accomplished by allowing the microprocessor and the configuration data (the control and signalling data format) to control the conditions with cause scanning to begin and end. The signals which can cause scanning to stop are: trigger, enable and ack. Also, certain applications require signal combinations to being and end scanning, this is accomplished using SOS (start-of-scan) and EOS (end-of-scan) condition variables. These variables are stored in NVM (160)

and are, upon application of power, loaded into the microprocessor's internal RAM (where they are accessed as directed by the microprocessor's internal operating program).

The TSTSOS and TSTEOS routines, called during idle (TSTSOS) and during scanning (TSTEOS) control the detection of the appropriate signals to cause scanning to begin and end, respectively.

Figure 29:
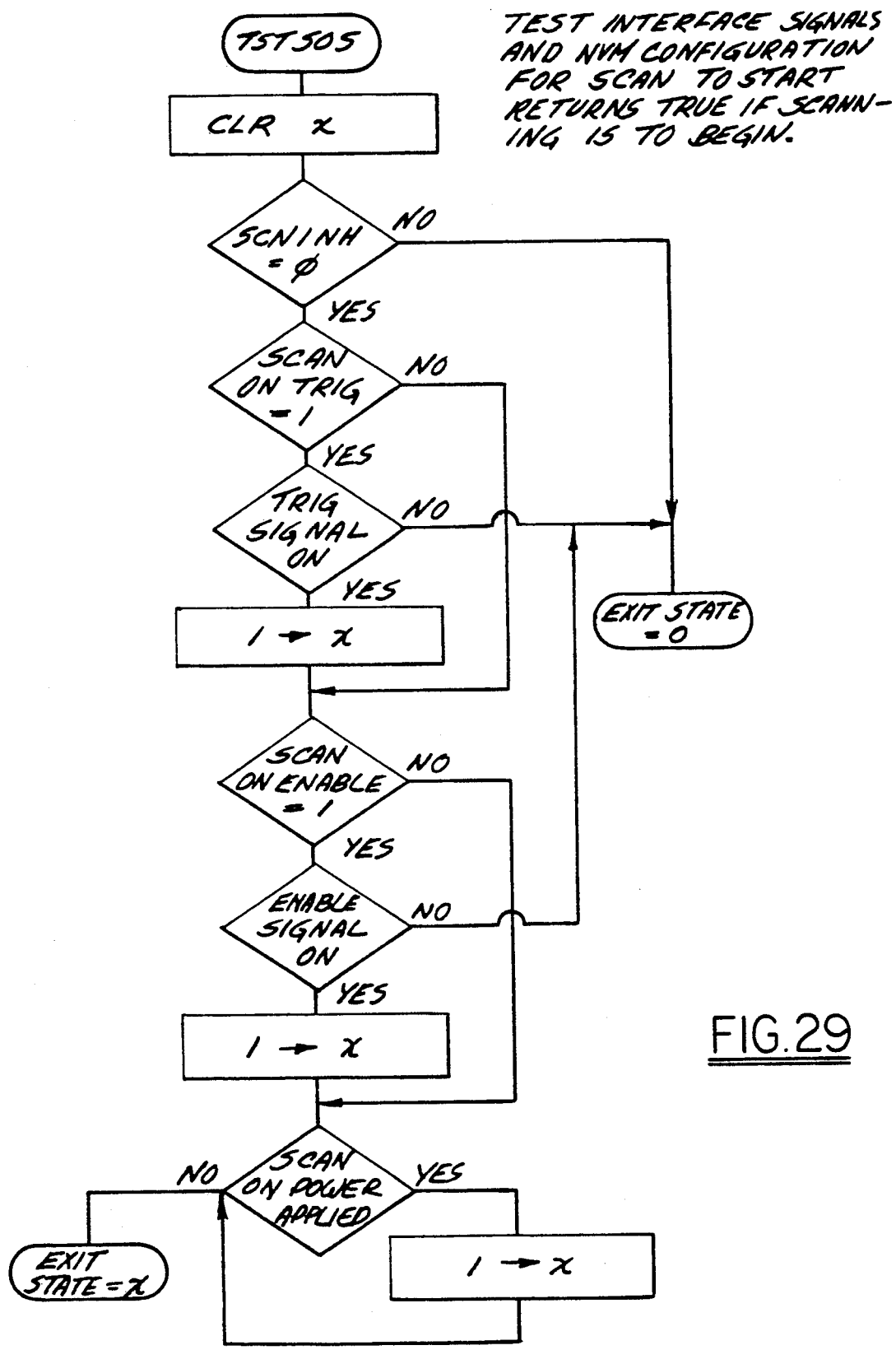

As shown in FIG. 29, the TSTSOS routine checks the loaded configuration data to determine which of the three possible start-of-scan conditions are active. When an active condition is found its corresponding signal is tested. If the signal is true, a variable, x, is set, otherwise, the routine exits false. In this manner, multiple start scan conditions are logically ANDed. Scan with power on is always a condition, since the scanner cannot operate without power, however, the condition is included to allow the scanner to scan continuously for those applications requiring it.

Figures 30, 31:
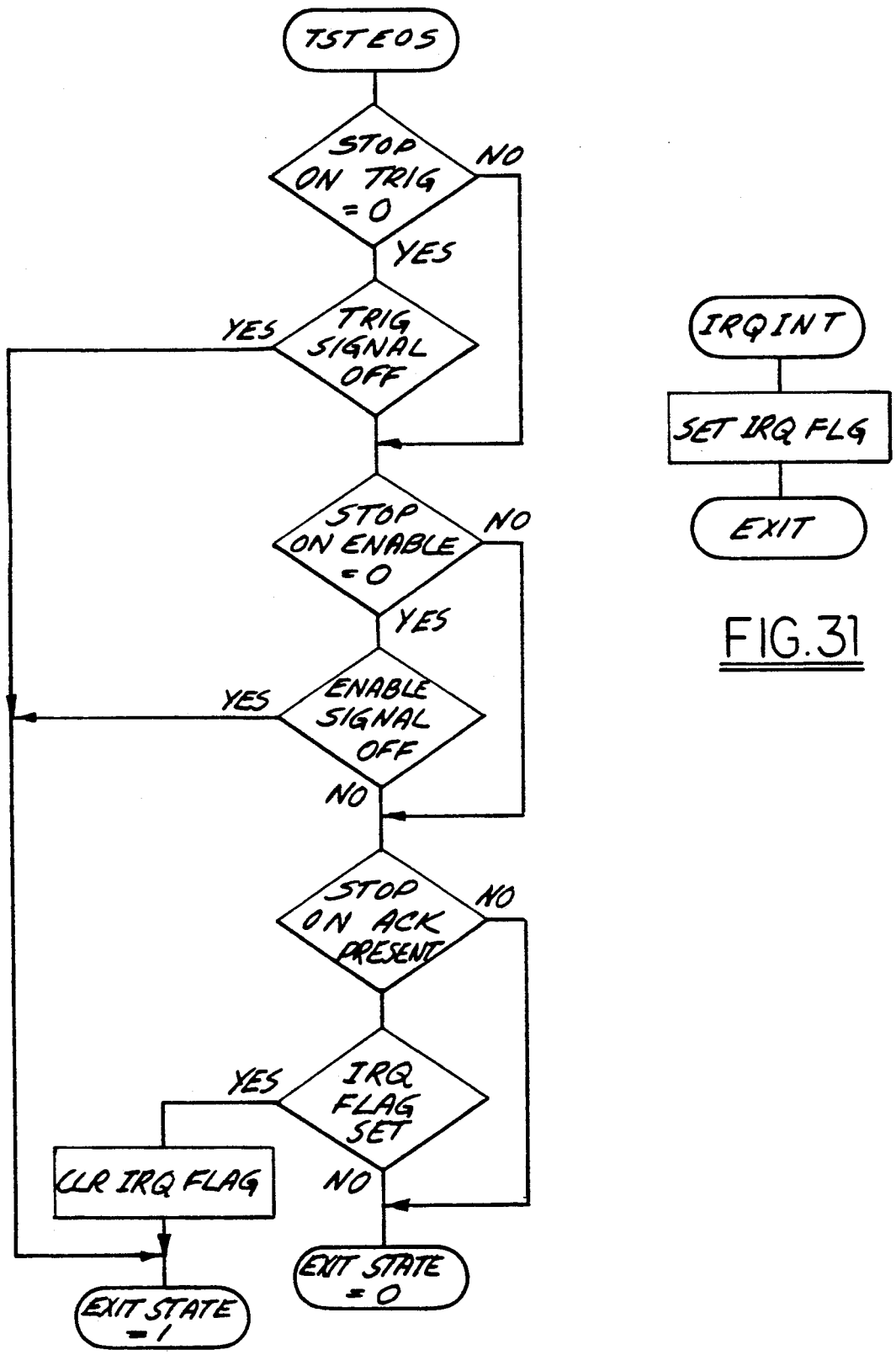

FIG. 30 shows the TSTEOS routine which is invoked during scanning to determine if scanning is to stop. Like the TSTSOS routine, TSTEOS checks each of the three possible end-of-scan conditions, and if the condition is found to be true, the corresponding signal is tested to be false. If any signal is found to be false TSTEOS exits true indicating that scanning is to stop. In this manner scanning stops when the any of the specified stop condition(s) are found to be false (e.g., trigger released, or the Enable false or and ACK signal are detected), which is a negative-logic OR function.

In order for the scanner to interface with various types of decoders currently in use, the scanner must be able to accept pulses on the ACK signal line which are sub-microsecond in width. Because the microprocessor is not capable of periodically examining any of its input signals often enough to detect such pulses, an edge-sensitive interrupt input of the microprocessor is employed to detect ACK pulses. As shown in FIG. 31, the IRQINT is invoked when such an edge is detected and the variable IRQFLG is set to indicate the presence of an ACK pulse.

In the event that the detection of objects without the use of reflective tape is desired, the program shown on FIG. 27 is modified as follows (see FIG. 27a). A decision process is inserted between the decision pulse >0 and pulses/2>B as to whether the reflective tape mode is set. If so, the program proceeds as shown in FIG. 27 and described above. If the reflective tape mode is not set, then another decision process is implemented, namely whether pulses/2 <bars has not been computed. If not computed (no), the program proceeds to φ→ pulses → bars. If computed (yes), the program proceeds to the no object routine.

From the foregoing description it will be apparent that there has been provided an improved system for hands-free or fixed station operation of a bar code scanner. A bar code laser scanner has been described which embodies the invention. Other types of symbol scanners may be used in systems embodying the invention and other variations and modifications within the scope of the invention will undoubtedly become apparent to those skilled in the art. Accordingly, the foregoing description should be taken as illustrative and not in a limiting sense.

I claim:

1. Apparatus for reading a symbols on an object for obtaining information with respect thereto which comprises means for reading said symbols in response to the reflection of a beam of light emanating therefrom, means for detecting from a reflective area on a surface separate from or of the object on which area said beam is incident and from which said beam is reflected to present said symbol thereon in intercepting relationship with said beam, means for testing the presence of said reflective area on said surface separate from the object and of the object, said testing means including means for providing said beam in successive means including means for providing said beam in successive pulses of emanating light which are returned by said reflecting areas when reflected thereby, and means responses to the ratio of said pulses of emanating light to said return pulses of light for operating said reading means.

2. The apparatus according to claim 1 wherein said beam is directed into a detection zone from a body containing said reading means, means for holding said body on one side of said zone a sufficient distance to insert said object in blocking relationship with said beam.

3. The apparatus according to claim 2 wherein said holding means is a stand having a base, an upright support on said base including means for receiving said body in supported relationship thereon with said beam projecting downwardly toward said base, said base having said surface with said reflective area located with respect to said upright support such that said beam is incident on said area when said body is disposed in said supported relationship on said support.

4. The apparatus according to claim 1 further comprising means for operating said reading means which includes means for changing said emanating beam from successive pulses of light to continuous light when said ratio of emanating to returned pulses becomes greater than a certain value.

5. The apparatus according to claim 4 wherein said reading means includes means for generating said emanating beam as pulses or continuous light, with said pulses being of lower intensity of illumination than said continuous light.

6. The apparatus according to claim 1 wherein said reading means includes means for generating said emanating beam and means for effectively scanning a path across said symbol with said emanating beam, said reading means having means conditioning said reading means to operate in a pulsing mode during which said means for providing said emanating beam in successive pulses is operative in a scanning mode during which said means for effectively scanning said beam is operative, and means for operating said reading means initially in said pulsing mode and then when said ratio of emanating pulses to returned pulses exceeds a predetermined value, in said scanning mode.

7. The apparatus according to claim 6 wherein said reading means includes means responsive to light reflected from said symbol for decoding said symbol, and means responsive to the decoding of said symbol during said scan for terminating said scanning mode.

8. The apparatus according to claim 6 wherein said reading means includes means for translating said returned light into electrical signals, means for amplifying said signals, and means for detecting said signals to provide outputs corresponding to said returned light from said reflective area and when said object intercepts said emanating beams from said symbol, means responsive to said signals for varying the gain of said amplifying means for providing relatively high and relatively low gain conditions in response to reflected light from said object and from said reflective area respectively, and means for terminating said scanning mode in response to the presence of said low gain condition for a number of scans sufficient to indicate the removal of said object from intercepting relationship with said emanating beam.

9. The apparatus according to claim 6 wherein said symbol is a bar code having a plurality of side by side bars and spaces which is representative of information concerning said object, means operative during said scanning mode for detecting the number of bars of said code per scan, and means for terminating said scanning mode, responsive to a condition where the number of bars of said code scan is less than eighteen for each of a number of successive scans sufficient to indicate the removal of said object from intercepting relationship with said code.

10. The apparatus according to claim 6 wherein said symbol is a bar code having a plurality of side by side bars and spaces which is representative of information concerning said object, means operative during said scanning mode for detecting the number of bars of the code per scan, and means for terminating said scanning mode responsive to a condition where the number of bars of the code per scan is less than eighteen for each of a number of successive scans sufficient to indicate the removal of said object from intercepting relationship with said code, and wherein said reading means includes means for translating said returned light into electrical signals, means for amplifying said signals, and means for detecting said signals to provide outputs corresponding to said returned light from said reflective area and when said object intercepts said emanating beam from said code, means responsive to said signals for varying the gain of said amplifying means for providing relatively high and relatively low gain conditions in response to reflected light from said code and from said reflective area respectively, and means for terminating said scanning mode in response to the presence of said high gain condition for a number of scans sufficient to indicate the removal of said object from intercepting relationship with said emanating beam.

11. The apparatus according to claim 6 further comprising means for inhibiting entry into said scanning mode unless entry into the pulsing mode precedes entry into the scanning mode.

12. The apparatus according to claim 1 further comprising computer means for providing said testing means and ratio responsive means in accordance with an application program entered therein.

13. The method for detecting the presence of an object having a symbol representing information concerning the object in the path of light from a beam projected from a symbol reader unit which comprises the steps of pulsing the light beam, directing the pulsing light beam toward a reflective surface defined by said object or a reflector separate therefrom along the path which is blocked by the object when reading of the symbol thereon is desired, and detecting the presence of said object or said reflector separate therefrom with the reader depending upon whether or not a first number of pulses in said succession directed towards said reflector exceeds a second number of pulses in said succession reflected from said reflector.

14. The method of reading symbols on an object when it is in a detection zone between the reflector when used and a symbol reading unit, which comprises the method of detecting said object using the method as set forth in claim 13, and initiating reading of said symbol when the ratio of said numbers exceeds a predetermined value.

15. The method according to claim 14 wherein said unit is a bar code scanner, said label is a bar code and said initiating step is carried out by initiating scanning of said code.

16. The method according to claim 15 further comprising the step of terminating scanning of said symbol when at least one of the steps in the group consisting of the following steps is carried out: (a) successfully reading said symbol, (b) detecting when the step of scanning of said code occurs without the step of pulsing said beam immediately preceding said ,scanning, step. (c) detecting of less than eighteen bars of the bar code per scan for a sufficient number of scans to indicate removal of said object from blocking relationship with said beam when said symbol is a bar code, and (d) measuring the intensity of said reflected beam as being indicative of light reflected from said reflector for a sufficient number of scans to indicate the removal of said object from blocking relationship with said beam.

* * * * *